(12) United States Patent
Takagi et al.

(10) Patent No.: US 12,152,113 B2
(45) Date of Patent: Nov. 26, 2024

(54) FILLER-LOADED HIGH THERMAL CONDUCTIVE DISPERSION LIQUID COMPOSITION HAVING EXCELLENT SEGREGATION STABILITY, METHOD FOR PRODUCING SAID DISPERSION LIQUID COMPOSITION, FILLER-LOADED HIGH THERMAL CONDUCTIVE MATERIAL USING SAID DISPERSION LIQUID COMPOSITION, METHOD FOR PRODUCING SAID MATERIAL, AND MOLDED ARTICLE OBTAINED USING SAID MATERIAL

(71) Applicant: Takagi Chemicals, Inc., Okazaki (JP)

(72) Inventors: Noriaki Takagi, Okazaki (JP);
Masakuni Takagi, Okazaki (JP);
Yuusuke Nagatani, Okazaki (JP);
Yuuta Terao, Okazaki (JP); Daisuke Watanabe, Okazaki (JP); Kazuo Matsuyama, Okazaki (JP)

(73) Assignee: TAKAGI CHEMICALS, INC., Okazaki (JP)

( * ) Notice: Subject to any disclaimer, the term of this patent is extended or adjusted under 35 U.S.C. 154(b) by 0 days.

(21) Appl. No.: 18/491,613

(22) Filed: Oct. 20, 2023

(65) Prior Publication Data

US 2024/0092981 A1 Mar. 21, 2024

Related U.S. Application Data

(63) Continuation of application No. 16/611,769, filed as application No. PCT/JP2018/036013 on Sep. 27, 2018, now abandoned.

(30) Foreign Application Priority Data

Nov. 14, 2017 (JP) ................................. 2017-219202

(51) Int. Cl.
*C08J 3/205* (2006.01)
*C08J 5/10* (2006.01)
(Continued)

(52) U.S. Cl.
CPC ................. *C08J 3/205* (2013.01); *C08J 5/10* (2013.01); *C08K 3/04* (2013.01); *C08K 3/22* (2013.01);
(Continued)

(58) Field of Classification Search
CPC ........ C08K 2003/282; C08K 2003/385; C08K 3/04; C08K 3/041; C08K 2201/001;
(Continued)

(56) References Cited

U.S. PATENT DOCUMENTS

| | | | |
|---|---|---|---|
| 5,300,553 | A | 4/1994 | Yamanashi et al. |
| 2008/0153960 | A1 | 6/2008 | Meneghetti et al. |

(Continued)

FOREIGN PATENT DOCUMENTS

| | | |
|---|---|---|
| JP | 5105781 A | 4/1993 |
| JP | 2000297204 A | 10/2000 |

(Continued)

*Primary Examiner* — Kregg T Brooks
(74) *Attorney, Agent, or Firm* — FOX ROTHSCHILD LLP

(57) ABSTRACT

A problem of heat dissipation in motors, converters, high-luminance LEDs, power devices, power supplies, and the like becomes significant. Provided is a means for capable of providing a product, which has favorable workability, segregation stability, storage stability, and the like, penetrates into a gap in a coil portion, an interface in casing, and the like without any gaps, enhances thermal conductivity/heat dissipation properties of a molded product thus obtained, and is excellent in electrical characteristics, toughness/elastic modulus, thermal resistance, thermal cycle properties, (Continued)

Example 2 molded article SEM photograph

Example 2 molded article N atom mapping

Example 4 molded article SEM photograph

Example 4 molded article N atom mapping and the like, in the case of using the product for a cast molding resin, a potting material (sealing material), an adhesive, grease, and the like.

Provided is a filler-loaded high thermal conductive dispersion liquid composition being formed by uniformly dispersing a powder composition, which contains organic polymer particles containing thermoplastic polymer particles, and high thermal conductive filler particles which contain filler particles having a graphite-like structure and is obtained by pulverizing 5 to 70 parts by weight of the organic polymer particles and 30 to 95 parts by weight of the high thermal conductive filler particles with respect to 100 parts by weight of the total amount of these components by using a pulverizing machine, which performs grinding with frictional force or impact force, to cause delamination or cohesive failure while maintaining an average planar particle size of the filler particles having a graphite-like structure, in the powder composition, the vicinity of the high thermal conductive filler particles being covered with the micronized organic polymer particles and the covered particles being uniformly dispersed, using 25 to 250 parts by weight of a liquid reactive dispersing medium and/or a dispersing medium containing a thermoplastic polymer having a deflection temperature under load or a melting point lower than that of the thermoplastic polymer used in the powder composition with respect to 100 parts by weight of the powder composition, and the dispersion liquid composition having conditions that a thermal conductive infinite cluster exhibiting a thermal conductivity of 1 to 35 W/mK is formed and a concentration of the high thermal conductive filler particles is equal to or more than a percolation threshold.

20 Claims, 2 Drawing Sheets

(51) Int. Cl.
*C08K 3/04* (2006.01)
*C08K 3/22* (2006.01)
*C08K 3/28* (2006.01)
*C08K 3/38* (2006.01)
*C08L 63/00* (2006.01)
*C08L 79/04* (2006.01)

(52) U.S. Cl.
CPC .............. *C08K 3/38* (2013.01); *C08L 63/00* (2013.01); *C08L 79/04* (2013.01); *C08K 2003/222* (2013.01); *C08K 2003/282* (2013.01); *C08K 2003/385* (2013.01); *C08K 2201/001* (2013.01)

(58) Field of Classification Search
CPC .. C08K 9/10; C08J 3/203; C08J 3/205; C08L 63/00–10
See application file for complete search history.

(56) References Cited

U.S. PATENT DOCUMENTS

| | | |
|---|---|---|
| 2009/0184283 A1 | 7/2009 | Chung et al. |
| 2013/0101763 A1 | 4/2013 | Dean et al. |
| 2015/0030835 A1 | 1/2015 | Tanaka et al. |
| 2015/0259589 A1 | 9/2015 | Takagi et al. |

FOREIGN PATENT DOCUMENTS

| | | |
|---|---|---|
| JP | 200382229 A | 3/2003 |
| JP | 2007169461 A | 7/2007 |
| JP | 2008260190 A | 10/2008 |
| JP | 2009155370 A | 7/2009 |
| JP | 201018679 A | 1/2010 |
| JP | 2010505729 A | 2/2010 |
| JP | 2010132838 A | 6/2010 |
| JP | 2011162642 A | 8/2011 |
| JP | 2011231196 A | 11/2011 |
| JP | 2014055257 A | 3/2014 |
| JP | 2015204354 A | 11/2015 |
| JP | 2017008321 A | 1/2017 |
| WO | 2013099089 A1 | 7/2013 |
| WO | 201480743 A1 | 5/2014 |

Example 2 molded article SEM photograph

Example 2 molded article N atom mapping

Example 4 molded article SEM photograph

Example 4 molded article N atom mapping

Example 26 molded article S atom mapping

Example 26 molded article C atom mapping

Example 26 molded article N atom mapping

Example 26 molded article O atom mapping

Stator (without resin mold)   Resin molded stator

FILLER-LOADED HIGH THERMAL CONDUCTIVE DISPERSION LIQUID COMPOSITION HAVING EXCELLENT SEGREGATION STABILITY, METHOD FOR PRODUCING SAID DISPERSION LIQUID COMPOSITION, FILLER-LOADED HIGH THERMAL CONDUCTIVE MATERIAL USING SAID DISPERSION LIQUID COMPOSITION, METHOD FOR PRODUCING SAID MATERIAL, AND MOLDED ARTICLE OBTAINED USING SAID MATERIAL

TECHNICAL FIELD

The present invention relates to a filler-loaded high thermal conductive dispersion liquid composition having excellent segregation stability and having fluidity at the time of cast molding or potting, a method for producing the dispersion liquid composition, a filler-loaded high thermal conductive material using the dispersion liquid composition, a method for producing the material, and a molded article obtained using the material. More specifically, the present invention relates to a filler-loaded high thermal conductive material dispersion liquid composition which has favorable segregation stability by control of morphology (polymer microstructure) and can form an advanced thermal conduction path.

BACKGROUND ART

Along with advancement in a remarkable decrease in size and a remarkable increase in output of electric/electronic devices by the performance enhancement, efficiency enhancement, and the like of semiconductor elements, a large amount of heat generated in accordance therewith has been a problem. In particular, due to an increase in temperature by heat generated from coil portions in reactors for inverters and converters and stators for drive motors for next-generation vehicles and an increase in temperature by heat generated from semiconductor element portions in power devices and high-luminance LED lights, various troubles such as an extreme decrease in efficiency, peeling-off at an interface between different kinds of materials, and generation of cracks have been problems. Development of heat dissipating members and components in the vicinity of semiconductor elements for coping with those troubles has been an urgent problem, and particularly, various cast molding resins and potting materials in which fluidity is imparted to materials have been developed.

For example, Patent Literature 1 discloses a reactor capable of ensuring heat dissipation properties of a coil and suppressing occurrence of an irreversible change such as cracking caused by low temperature and compression due to vibration of the coil and a cast molding resin used for the reactor, formed from a urethane-based or epoxy-based thermosetting resin, and having a glass transition temperature of −30° C. or lower and JIS A hardness at 25° C. of 20 or more and 52 or less.

Further, Patent Literature 2 discloses a cast molding resin composition, which contains, as essential components, a cationic polymerization catalyst and an ionic adsorbent for improving electrical characteristics and strength of coil insulation, storage stability, and the like and is obtained by adding and mixing an inorganic filling material having a thermal conductivity of 10 W/mK or more to an epoxy resin composition, and a rotating electrical machine in which the cast molding resin composition is cured by cast molding the composition to a coil or a coil end. Furthermore, Patent Literature 3 discloses an epoxy resin molding material for sealing a motor, the material being excellent in productivity and working environment and having favorable thermal resistance, thermal conductivity, high temperature water resistance, and reduction in a coefficient of linear expansion and being suitable for sealing a motor, and the material containing (A) an epoxy resin, (B) an epoxy resin curing agent, (C) a curing accelerator, (D) an inorganic filler, (E) a silicone resin, (F) a thermoplastic resin, and (G) a silane coupling agent.

Furthermore, Patent Literature 4 discloses an insulating composition which is relatively easily handled upon molding and has high adhesiveness to a metal such as copper and high thermal conductivity and in which a liquid crystalline polymer phase and a thermosetting polymer phase are separated and the liquid crystalline polymer phase forms a continuous phase, and an insulating sheet containing the insulating composition and a thermal conductive filler. In addition, Patent Literature 5 discloses a thermal conductive thermosetting resin composition having a composition viscosity in molding suppressed to a low value, hardly causing deterioration in excellent various physical properties such as thermal resistance and mechanical characteristics inherent in a thermosetting epoxy resin, and having excellent thermal conductivity while covering the defects such as low toughness or low crack resistance inherent in the epoxy resin, the resin composition containing a thermosetting epoxy resin (A), a thermosetting resin except the thermosetting epoxy resin (A) or a thermoplastic resin (B), and a high thermal conductive inorganic filler (C), at least the thermosetting epoxy resin (A) forming a continuous phase.

Further, Patent Literature 6 discloses a coating liquid which contains a composition obtained by pulverizing organic polymer particles containing a thermoplastic polymer and a thermal conductive filler having a graphite-like structure by using a pulverizing machine, which performs grinding with frictional force or impact force, and a dispersing medium.

Furthermore, Patent Literature 7 discloses a method and an apparatus for molding which prevent the occurrence of a void in a molding resin by preventing the air entrainment of the resin and the fouling or the clogging of a nozzle tip by free shots when a stator is molded by the resin.

CITATION LIST

Patent Literatures

Patent Literature 1: JP 2015-204354 A
Patent Literature 2: JP 2000-297204 A
Patent Literature 3: JP 2009-155370 A
Patent Literature 4: JP 2010-18679 A
Patent Literature 5: JP 2010-132838 A
Patent Literature 6: JP 2017-008321 A
Patent Literature 7: JP 2008-260190 A

SUMMARY OF INVENTION

Technical Problem

As described above, in order to cope with a decrease in size and an increase in output of electric/electronic devices and to solve a problem of heat generation of a coil portion of a reactor or a stator, heat dissipation properties, segregation stability, workability, thermal resistance, mechanical characteristics, electrical characteristics, and the like of a cast molding resin or a potting material which can be injected in a coil portion have been improved.

Meanwhile, progress of research development and practical realization of novel materials such as GaN and SiC having high electrical field resistance, high energy gap, high mobility, and the like in a recent power semiconductor (power electronics) has been significant, and as compared to a conventional Si-based material, the novel materials enable operation under the conditions of a high frequency, a high voltage, and a high temperature and greatly contributes to a decrease in size and an increase in efficiency of electric/electronic equipment. Further, compact design is required in moving vehicles such as automobiles, aircrafts, and unmanned aircrafts on which a drive source is placed, a problem of heat generation is particularly important, and in response to the development of the novel materials mentioned above, innovative novel heat dissipation materials that can cope with stricter various requirements are required.

A polymer material (resin) has been conventionally preferably used since the material is excellent in designability, but the thermal conductivity of the resin itself is extremely low and the resin is usually used as a composite material added with a thermal conductive filler. In order to form a thermal conduction path for transferring heat in a material, it is necessary to add a certain amount (threshold of thermal conductivity) or more of a thermal conductive filler. Therefore, a viscosity of the composite material significantly increases, and there are problems in that not only workability or the like deteriorates but also it is difficult to remove air bubbles having a great effect on injection of the composite material to a gap or on thermal conductivity.

That is, in Patent Literature 1, there is only description that an additive such as a filler is mixed as necessary, and there is no specific description of an improvement in thermal conductivity of the resin. Further, also in Patent Literatures 2 and 3, the thermal conductivities of the resins added with a filler at a concentration of 33 wt % in the former and a filler at a concentration of 75 to 77 wt % in the latter are small values, that is, 1.7 W/mK and 1.9 W/mK at most, respectively, and there is no description of fluidity such as a viscosity that is an indicator of workability.

Furthermore, in Patent Literature 4, it is shown that the resin composition in which the liquid crystal polymer is formed as a continuous phase slightly increases a thermal conductivity of the resin, but regarding cases of the high thermal conductive filler, it is described only that a coating solution added with methyl ethyl ketone is obtained, a thermal conductive sheet to be obtained after drying exhibits a high thermal conductivity, and the cases are not related to a cast molding resin or a potting material.

Also, in Patent Literature 5, an increase in thermal conductivity of the composition is achieved by preferentially dispersing the high thermal conductive inorganic filler in the thermosetting resin that becomes a continuous phase. However, since the thermosetting resin is preferentially dispersed in the continuous phase, when the concentration of the high thermal conductive filler is low, dispersion stability is deteriorated as well as thermal conductivity deteriorating, and when the concentration increases, the viscosity increases and workability is deteriorated, which is not preferable. Also, regarding the thermal conductivity, a value of 3.3 W/mK at most is only reported.

Furthermore, in Patent Literature 6, although the powder resin composition having a high thermal conductivity is obtained, the composition is dispersed in a general dispersing medium (diluent) in order to have fluidity, it is necessary to remove the dispersing medium after coating, and the composition is not reasonable for being used as a cast molding resin or a potting material. Further, in Patent Literature 7, a method and an apparatus by which the occurrence of a void and the fouling or the clogging of a nozzle tip are prevented are only mentioned, and there is no description on a resin.

In this regard, an object of the present invention is to provide a dispersion liquid composition being excellent in fluidity and segregation stability and a high thermal conductive material obtained by using the dispersion liquid composition and being excellent in thermal conductivity, dissipation properties, electrical characteristics, thermal resistance, mechanical characteristics, thermal cycle properties, two-color molding properties, and the like.

Solution to Problem

The present inventors have conducted intensive studies in order to solve the above-described problems, and as a result, have found that high thermal conductive filler particles containing organic polymer particles and thermal conductive filler particles having a graphite-like structure are pulverized using a pulverizing machine, which performs grinding with frictional force or impact force, to obtain a powder composition uniformly dispersed, the powder composition is uniformly dispersed in a liquid reactive dispersing medium and/or a dispersing medium containing a thermoplastic polymer having a deformation temperature under load or a melting point lower than that of the thermoplastic polymer used in the powder composition to obtain a dispersion liquid composition excellent in segregation stability, and the dispersion liquid composition is molded by heating, cooled, and solidified to obtain a high thermal conductive material excellent in thermal conductivity, heat dissipation properties, electrical characteristics, thermal resistance, mechanical characteristics, thermal cycle properties, two-color molding properties, and the like in which a thermal conductive filler-rich phase and a thermal conductive filler-non-rich phase coexist, thereby completing the present invention.

More specifically, compatibility with a resin is usually enhanced by treating a surface of a filler with a coupling agent; however, the present invention has been made to enhance compatibility with a resin used in a dispersing medium and improve segregation stability of a dispersion liquid by not only using a filler in a powder composition but also concurrently using a thermoplastic polymer, and to thereby improve physical properties and enable two-color molding using different kinds of materials.

That is, the present invention achieves the above-described objects by the following means.

(1) A filler-loaded high thermal conductive dispersion liquid composition being formed by uniformly dispersing a powder composition, which contains organic polymer particles containing thermoplastic polymer particles, and high thermal conductive filler particles which contain filler particles having a graphite-like structure and is obtained by pulverizing 5 to 70 parts by weight of the organic polymer particles and 30 to 95 parts by weight of the high thermal conductive filler particles with respect to 100 parts by weight of the total amount of these components by using a pulverizing machine, which performs grinding with frictional force or impact force, to cause delamination or cohesive failure while maintaining an average planar particle size of the filler particles having a graphite-like structure, in the powder composition, the vicinity of the high thermal conductive filler particles being covered with the micronized organic polymer particles and the covered particles being uniformly dispersed, using 25 to 250 parts by weight of a liquid reactive dispersing medium and/or a dispersing medium containing a thermoplastic polymer having a deflection temperature under load or a melting point lower than that of the thermoplastic polymer used in the powder composition with respect to 100 parts by weight of the powder composition, and the dispersion liquid composition having conditions that a thermal conductive infinite cluster exhibiting a thermal conductivity of 1 to 35 W/mK is formed and a concentration of the high thermal conductive filler particles is equal to or more than a percolation threshold;

(2) the filler-loaded high thermal conductive dispersion liquid composition described in the above item (1), in which the pulverizing machine is a ball mill, a roller mill, a bead mill, or a medium mill;

(3) the filler-loaded high thermal conductive dispersion liquid composition described in the above item (1) or (2), in which the thermoplastic polymer particles used in the powder composition contain at least one selected from the group consisting of a thermoplastic resin and a thermoplastic elastomer, all of which have crystallinity and/or aromaticity;

(4) the filler-loaded high thermal conductive dispersion liquid composition described in any one of the above items (1) to (3), in which the thermoplastic polymer particles used in the powder composition contain at least one selected from the group consisting of polyphenylene sulfide, polyethylene terephthalate, polybutylene terephthalate, polycarbonate, polyamide, polyethylene, and polypropylene;

(5) the filler-loaded high thermal conductive dispersion liquid composition described in any one of the above items (1) to (4), in which the filler particles having a graphite-like structure are hexagonal boron nitride particles and a thermal conductivity thereof is 1 to 25 W/mK;

(6) the filler-loaded high thermal conductive dispersion liquid composition described in the above item (5), in which the high thermal conductive filler particles further contain magnesium oxide particles;

(7) the filler-loaded high thermal conductive dispersion liquid composition described in any one of the above items (1) to (4), in which the high thermal conductive filler particles contain graphite particles and a thermal conductivity thereof is 3 to 35 W/mK;

(8) the filler-loaded high thermal conductive dispersion liquid composition described in the above item (7), in which the graphite particles contain natural graphite particles and/or artificial graphite particles;

(9) the filler-loaded high thermal conductive dispersion liquid composition described in the above item (8), in which the natural graphite particles contain scale-like graphite particles;

(10) the filler-loaded high thermal conductive dispersion liquid composition described in any one of the above items (1) to (9), in which the dispersing medium contains the reactive dispersing medium and the reactive dispersing medium contains an uncured thermosetting resin;

(11) the filler-loaded high thermal conductive dispersion liquid composition described in the above item (10), in which the uncured thermosetting resin contains a benzoxazine resin and/or a phenol-based epoxy resin;

(12) the filler-loaded high thermal conductive dispersion liquid composition described in the above item (10) or (11), in which the uncured thermosetting resin contains an epoxy reactive diluent and/or an epoxy-modified silicone resin;

(13) the filler-loaded high thermal conductive dispersion liquid composition described in any one of the above items (10) to (12), in which the reactive dispersing medium contains a curing agent;

(14) the filler-loaded high thermal conductive dispersion liquid composition described in the above item (13), in which the curing agent contains at least one selected from the group consisting of an amine-modified silicone resin, an alcohol-modified silicone resin, and a carboxylic acid-modified silicone resin;

(15) the filler-loaded high thermal conductive dispersion liquid composition described in any one of the above items (10) to (14), in which the reactive dispersing medium contains a catalyst;

(16) the filler-loaded high thermal conductive dispersion liquid composition described in the above item (15), in which the catalyst contains an imidazole compound;

(17) the filler-loaded high thermal conductive dispersion liquid composition described in any one of the above items (1) to (9), in which the dispersing medium contains the thermoplastic polymer and a deflection temperature under load or a melting point of the thermoplastic polymer is lower than that of the thermoplastic polymer particles used in the powder composition by 10° C. or more;

(18) the filler-loaded high thermal conductive dispersion liquid composition described in any one of the above items (1) to (17), in which a viscosity at a temperature at the time of cast molding or potting is 100 mPa·s or more and 300 Pa·s or less;

(19) the filler-loaded high thermal conductive dispersion liquid composition described in any one of the above items (1) to (18), in which the thermal conductive infinite cluster is based on a high thermal conductive filler-rich phase mainly attributable to the powder composition; and

(20) A method for producing a filler-loaded high thermal conductive dispersion liquid composition, the method including:

a step (1) of obtaining a powder composition, which contains organic polymer particles containing thermoplastic polymer particles, and high thermal conductive filler particles which contain filler particles having a graphite-like structure, by pulverizing 5 to 70 parts by weight of the organic polymer particles and 30 to 95 parts by weight of the high thermal conductive filler particles with respect to 100 parts by weight of the total amount of these components by using a pulverizing machine, which performs grinding with frictional force or impact force, to cause delamination or cohesive failure while maintaining an average planar particle size of the filler particles having a graphite-like structure, in the powder composition, the vicinity of the high thermal conductive filler particles being covered with the micronized organic polymer particles and the covered particles being uniformly dispersed; and a step (2) of uniformly dispersing the powder composition using to 250 parts by weight of a liquid reactive dispersing medium and/or a dispersing medium containing a thermoplastic polymer having a deflection temperature under load or a melting point lower than that of the thermoplastic polymer particles used in the powder composition with respect to 100 parts by weight of the powder composition to prepare a dispersion liquid composition having conditions that a thermal conductive infinite cluster exhibiting a thermal conductivity of 1 to 35 W/mK is formed and a concentration of the high thermal conductive filler is equal to or more than a percolation threshold.

(21) A filler-loaded high thermal conductive material being formed by uniformly dispersing a powder composition, which contains organic polymer particles containing thermoplastic polymer particles, and high thermal conductive filler particles which contain filler particles having a graphite-like structure and is obtained by pulverizing 5 to 70 parts by weight of the organic polymer particles and 30 to 95 parts by weight of the high thermal conductive filler particles with respect to 100 parts by weight of the total amount of these components by using a pulverizing machine, which performs grinding with frictional force or impact force, to cause delamination or cohesive failure while maintaining an average planar particle size of the filler particles having a graphite-like structure, in the powder composition, the vicinity of the high thermal conductive filler particles being covered with the micronized organic polymer particles and the covered particles being uniformly dispersed, using 25 to 400 parts by weight of a liquid reactive dispersing medium and/or a dispersing medium containing a thermoplastic polymer having a deflection temperature under load or a melting point lower than that of the thermoplastic polymer used in the powder composition with respect to 100 parts by weight of the powder composition, and by causing a dispersion liquid composition having conditions that a thermal conductive infinite cluster exhibiting a thermal conductivity of 1 to 35 W/mK, is formed and a concentration of the high thermal conductive filler is equal to or more than a percolation threshold to react under a condition that the reactive dispersing medium forms a crosslinked polymer, and/or to be fluidized at a temperature that is equal to or lower than a deflection temperature under load or a melting point of the thermoplastic polymer particles used in the powder composition and is equal to or higher than a deflection temperature under load or a melting point of the thermoplastic polymer used in the dispersing medium, then to be molded by heating at a pressure of 0 to 1000 kgf/cm$^2$ and at a temperature equal to or higher than a deflection temperature under load or a melting point of the thermoplastic polymer particles used in the powder composition, and cooled and solidified.

(22) the filler-loaded high thermal conductive material described in the above item (21), in which the filler-loaded high thermal conductive material is formed from a high thermal conductive filler-rich phase and a high thermal conductive filler-non-rich phase and the high thermal conductive filler-rich phase forms a thermal conductive infinite cluster;

(23) the filler-loaded high thermal conductive material described in the above item (21) or (22), in which the condition that the reactive dispersing medium forms a crosslinked polymer is that the reactive dispersing medium has a degree of cure of 80% or more;

(24) a method for producing a filler-loaded high thermal conductive material, the method including: a step (1) of obtaining a powder composition, which contains organic polymer particles containing thermoplastic polymer particles, and high thermal conductive filler particles which contain filler particles having a graphite-like structure, by pulverizing 5 to 70 parts by weight of the organic polymer particles and 30 to 95 parts by weight of the high thermal conductive filler particles with respect to 100 parts by weight of the total amount of these components by using a pulverizing machine, which performs grinding with frictional force or impact force, to cause delamination or cohesive failure while maintaining an average planar particle size of the filler particles having a graphite-like structure, in the powder composition, the vicinity of the high thermal conductive filler particles being covered with the micronized organic polymer particles and the covered particles being uniformly dispersed; a step (2) of uniformly dispersing the powder composition using 25 to 250 parts by weight of a liquid reactive dispersing medium and/or a dispersing medium containing a thermoplastic polymer having a deflection temperature under load or a melting point lower than that of the thermoplastic polymer particles used in the powder composition with respect to 100 parts by weight of the powder composition to prepare a dispersion liquid composition having conditions that a thermal conductive infinite cluster exhibiting a thermal conductivity of 1 to 35 W/mK is formed and a concentration of the high thermal conductive filler particles is equal to or more than a percolation threshold;

a crosslinking step (3) of allowing the dispersion liquid composition to react under a condition that the liquid reactive dispersing medium forms a crosslinked polymer; and/or a fluidizing step (4) of fluidizing the thermoplastic polymer used in the dispersing medium at a temperature that is equal to or lower than a deflection temperature under load or a melting point of the thermoplastic polymer used in the powder composition and is equal to or higher than a deflection temperature under load or a melting point of the thermoplastic polymer used in the dispersing medium;

a step (5) of molding by heating the material formed in the crosslinking step (3) and/or the fluidizing step (4) at a pressure of 0 to 1000 kgf/cm$^2$ and at a temperature equal to or higher than a deflection temperature under load or a melting point of the thermoplastic polymer particles used in the powder composition; and a step (6) of cooling and solidifying the material formed in the step (5);

(25) the method for producing a filler-loaded high thermal conductive material described in the above item (24), in which the condition that the reactive dispersing medium forms a crosslinked polymer is that the reactive dispersing medium has a degree of cure of 80% or more; and

(26) a molded article including the filler-loaded high thermal conductive material described in any one of the above items (21) to (23) or a filler-loaded high thermal conductive material produced by the production method described in the above item (24) or (25), the molded article being used as a high thermal conductive/heat dissipation component;

(27) the molded article described in the above item (26), in which the molded article is formed by laminating two layers of the filler-loaded high thermal conductive material, one layer of the two layers has a thermal conductivity of 3 to 35 W/mK and exhibits electrical conductivity with a surface electrical conductivity of 70 $(\Omega cm)^{-1}$ or less, and the other layer of the two layers has a thermal conductivity of 1 to 25 W/mK and is a semiconductor having a surface electrical conductivity of 0.1 to $10^{-10}$ $(\Omega cm)^{-1}$ or exhibits insulating properties with a surface electrical conductivity of $10^{-10}$ $(\Omega cm)^{-1}$ or less; and

(28) the molded article described in the above item (26) or (27), in which layers of the two layers of the filler-loaded high thermal conductive material are layers formed from gradient materials having different filler concentrations from each other.

Herein, the dispersion liquid composition is mainly configured from the powder composition and the dispersing medium for uniformly dispersing the powder composition. The organic polymer particles containing thermoplastic polymer particles, the high thermal conductive filler particles which contain filler particles having a graphite-like structure, and the like are constituents of the powder composition and have a particle shape in the state of the dispersion liquid. Since the liquid reactive dispersing medium containing an uncured thermosetting resin and/or the thermoplastic polymer having a lower melting point than the thermoplastic polymer used in the powder composition constitute the dispersing medium, these are important constituents for providing fluidity at the time of cast molding, potting, and the like, form a continuous phase in the dispersion liquid at the time of cast molding or potting, and control fluidity represented by a dispersion liquid viscosity.

Advantageous Effects of Invention

The filler-loaded high thermal conductive dispersion liquid composition according to the present invention (hereinafter, also simply abbreviated as "dispersion liquid composition") is obtained by uniformly dispersing and stabilizing the powder composition formed from the organic polymer particles and the high thermal conductive filler particles by using a liquid reactive dispersing medium having a low viscosity and/or a thermoplastic polymer having a deflection temperature under load or a melting point lower than that of the thermoplastic polymer particles used in the powder composition, and at the time of cast molding or potting, the dispersing medium becomes a continuous phase and mainly controls fluidity.

In the powder composition, by covering the vicinity of the high thermal conductive filler particles having a high specific gravity with the organic polymer particles containing micronized thermoplastic polymer particles having a specific gravity close to the dispersing medium and having high affinity with the reactive dispersing medium and the thermoplastic polymer used as the dispersing medium, the sedimentation of the high thermal conductive filler particles and strong aggregation between the filler particles are suppressed, and segregation stability and storage stability are improved. As a result, it is easy to perform injection to a mold, potting to a device, and the like, and it is possible to perform uniform insertion thoroughly in minute gaps, and thus not only workability but also stable product quality and high performance inherent in a material can be exhibited. In particular, at the time of injection to a mold or the like in accordance with a strong shear force and/or at a high temperature, separation or aggregation of the filler is suppressed, and uniform injection of a composite material can be performed.

Further, regarding the aforementioned dispersion liquid composition, at the stage in which the reactive dispersing medium used as the dispersing medium is crosslinked and/or the stage in which the thermoplastic polymer used as the dispersing medium is fluidized, the initial concentration of the high thermal conductive filler, which is a constituent element of the powder composition, in the powder composition is maintained, then at the stage in which the thermoplastic polymer particles, which are other constituent elements of the powder composition, are heated to a temperature that is equal to or higher than the deflection temperature under load or the melting point, the micronized organic polymer part is softened and/or melted, then at the stage of cooling/solidifying, a sea-island structure formed from a filler-rich phase and a filler-non-rich phase is formed, the component having high affinity with the filler thinly covers the vicinity of the high thermal conductive filler particles to become a filler-rich phase, and an advanced thermal conduction path in which the high thermal conductive filler is efficiently connected is formed.

That is, since the dispersion liquid composition is divided into the high thermal conductive filler-rich phase and the high thermal conductive filler-non-rich phase, a thermal conductive infinite cluster based on the filler-rich phase is easily formed, and a percolation threshold of thermal conductivity with respect to the concentration of the high thermal conductive filler particles is also lowered. Therefore, as compared to the case of containing no thermoplastic polymer particles in the powder composition, the present invention exhibits a high thermal conductivity in the same concentration of the high thermal conductive filler, can exert excellent properties also in mechanical characteristics, thermal cycle properties, and the like by the filler-rich phase and the filler-non-rich phase being relatively uniformly dispersed, and achieves an increase in thermal conductivity by advanced morphologic control.

Furthermore, in the case of performing two-color molding of composite materials by using insulating filler particles and conductive filler particles as high thermal conductive filler particles or the case of molding composite materials (gradient materials) each having a different filler concentration, connection between the high thermal conductive filler particles is promoted by presence of the filler-rich phase in the interface therebetween, a thermal resistance at the interface therebetween is significantly reduced, and a mechanical strength can be improved by reconstruction of morphology by softening and/or melting and cooling/solidifying of the resin component at the interface.

Furthermore, since the dispersion liquid composition of the present invention is excellent in segregation stability, not only workability is improved, but also particles having a larger specific gravity can be contained as the high thermal conductive filler so that the thermal conductivity and the electrical conductivity can be improved. In addition, since a thermosetting resin and a thermoplastic resin which have various performances can be used as the dispersing medium, it is possible to cope with various requirements particularly for electric/electronic devices that are diversified.

Since the present invention is configured as described above, it is possible to provide a product which has favorable workability, segregation stability, storage stability, and the like, penetrates into a gap in a coil portion, an interface in casing, and the like without any gaps, enhances thermal conductivity or heat dissipation properties of a molded product thus obtained, and is excellent in electrical characteristics, toughness/elastic modulus, thermal resistance, thermal cycle properties, and the like, in the case of using the product for a cast molding resin, a potting material (sealing material), an adhesive, grease, and the like. In particular, a material using an insulating filler is used for parts necessary for insulating properties of electric devices having a coil portion of a reactor or a stator of a drive motor, an electric motor, a power generating motor, and the like, electronic devices having a semiconductor substrate such as a power devices and high-luminance LED lights, and the like, a material using a conductive filler is used for a radiating fin, a housing, and the like not necessary for insulating properties, or both materials are integrally molded so that an increase in temperature of a coil portion or a semiconductor element is efficiently prevented and this can contribute to an improvement in efficiency or a decrease in size of a device. Further, it is also possible to achieve prevention of failure, breakdown, or the like of electric/electronic devices and packaging of devices and electronic/electric devices excellent in waterproof property, dustproof property, and the like are obtainable. However, even when a conductive filler is used, in a case where the electrical conductivity of the material is low and the material has insulating properties or a case where the insulating properties of the coil portion are sufficiently guaranteed, the material can be used for parts necessary for insulating properties. In addition, by using a resin, the material can be utilized as EMC-prevention component/member for noise prevention, and can be useful for malfunction or the like of sensors that is concerned with widespread of automated driving and IoT.

DESCRIPTION OF EMBODIMENTS

Figure 1:
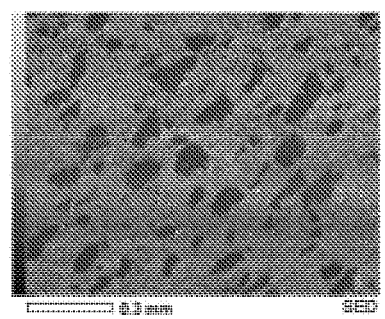
FIG. 1 illustrates photographs showing results of SEM observation and N atom mapping of molded articles produced in Example 2 (filler concentration 40 wt %) and Example 4 (filler concentration 60 wt %).
Figure 1:
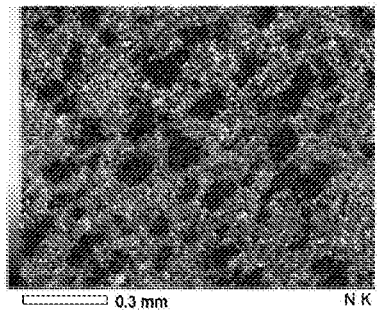
Figure 1:
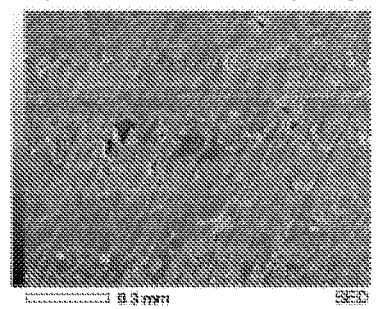
Figure 1:
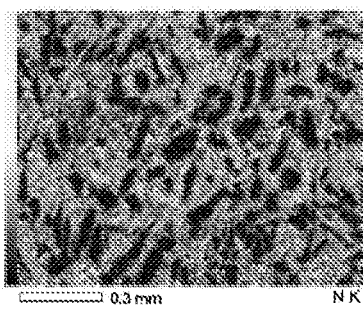

Hereinafter, embodiments for carrying out the present invention will be described in detail.

<Filler-Loaded High Thermal Conductive Dispersion Liquid Composition>

According to an aspect of the present invention, there is provided a filler-loaded high thermal conductive dispersion liquid composition having excellent segregation stability, the filler-loaded high thermal conductive dispersion liquid composition being formed by pulverizing organic polymer particles containing thermoplastic polymer particles and high thermal conductive filler particles which contain filler particles having a graphite-like structure at a specific ratio by using a specific pulverizing machine to cause delamination or cohesive failure of the filler particles while maintaining an average planar particle of the filler particles having a graphite-like structure to obtain a powder composition in which the filler and the organic polymer are uniformly dispersed, and uniformly dispersing the powder composition by using a specific amount of a reactive dispersing medium and/or a dispersing medium containing a thermoplastic polymer with respect to the powder composition.

(Powder Composition)

The powder composition used in the present invention is mainly configured by organic polymer particles and high thermal conductive filler particles which contain filler particles having a graphite-like structure, and exists as a solid moiety of a powder form when the dispersion liquid composition of the present invention is fluidized to be injected or potted into a mold or the like. Then, a material (molded article) formed from the dispersion liquid composition is obtained by causing the dispersion liquid composition according to the present invention to be fluidized under a specific temperature condition, molded at a specific temperature and at normal pressure or under pressurization, and cooled and solidified. In the material, a filler-rich phase and a filler-non-rich phase involving the high thermal conductive filler and/or the organic polymer that constitute the powder composition coexist and are uniformly distributed, and thus an advanced thermal conduction path can be formed and high thermal conductivity, excellent electrical characteristics, mechanical characteristics, and the like can be exhibited.

[Organic Polymer Particles]

The average particle size of the organic polymer particles used in the present invention is usually 1 to 5000 μm and preferably to 500 μm. When the average particle size of the organic polymer particles is 1 μm or more, no special apparatus for micronization is needed. On the other hand, when the average particle size of the organic polymer particles is 5000 μm or less, defective dispersion is not likely to occur at the time of pulverizing and mixing. Organic polymer particles including lumpy objects having a large particle size can be used after being pretreated in advance by pulverization and/or crushing, classification, and the like to obtain a desired average particle size. The organic polymer particles preferably have an aromatic hydrocarbon structure similar to the high thermal conductive filler particles having a graphite-like structure, and it is particularly preferable to crystallize the organic polymer in the vicinity of the filler in the presence of the filler, along the planar direction of the filler.

Examples of the organic polymer particles that can be used include thermoplastic polymers formed from a thermoplastic resin and an uncrosslinked elastomer, all of which are mainly formed from thermoplastic polymer particles, have crystallinity and/or aromaticity, and are used in the field of molding. The melting point of the thermoplastic polymer used as the organic polymer particles is not particularly limited, except that it is not lower than the melting point of the thermoplastic resin used in the dispersing medium, but the melting point thereof is preferably 120° C. or higher, more preferably 130 to 400° C., and particularly preferably 150 to 350° C. The thermoplastic polymer becomes a solid content moiety in a state of being in a dispersion liquid at the time of fluidization. Furthermore, the organic polymer according to the present invention can contain a thermosetting polymer formed from an uncured thermosetting resin and is preferably in a solid state at the time of producing the powder composition. The melting point can be obtained from an endothermic peak at the time of melting using a differential scanning calorimeter (DSC) and a differential thermal analysis (DTA) apparatus, and a deflection temperature under load can be used as an indication of a non-crystalline polymer showing no melting point.

Examples of the crystalline aromatic thermoplastic resin include aromatic polyesters such as polyethylene terephthalate, polybutylene terephthalate, polytrimethylene terephthalate, polyethylene naphthalate, and liquid crystal polyester; and known thermoplastic polymers having crystallinity and aromaticity such as polyphenylene sulfide, aromatic polyimide precursors, phenol (novolac type and the like) phenoxy resins, polyether ketone, polyether ether ketone, polystyrene, polybenzimidazole, and polyphenylene oxide. These resins are particularly preferable since the resins can strongly fix the filler particle between fillers due to the crystallinity of the polymer grown onto the filler surface and/or compatibility with the filler in a case where affinity with the filler is high; electrical conductivity or insulating properties, and thermal conductivity can be markedly increased without significantly impairing mechanical characteristics; and the coefficient of thermal expansion can be appropriately controlled.

Examples of the crystalline thermoplastic resin include known thermoplastic resins having crystallinity, such as polyolefins such as polyethylene and polypropylene; polyoxymethylene, polyamide, polymethyl methacrylate, polyvinyl chloride, polyvinylidene chloride, polyketone; fluororesins such as polytetrafluoroethylene; cycloolefin polymers, polyacetal, and ultrahigh molecular weight polyethylene. These resins are preferable since the resins can fix the filler particle between fillers due to the crystalline of the polymer grown onto the filler surface in a case where affinity with the filler is high; electrical conductivity or insulating properties, and thermal conductivity can be increased without impairing mechanical characteristics; and the coefficient of thermal expansion can be appropriately controlled.

Examples of the non-crystalline aromatic thermoplastic resin include known thermoplastic polymers having aromatic substituents such as polycarbonate, polyphenylene ether, polyarylate, polysulfone, polyether sulfone, polyether imide, polyamideimide, and liquid crystal polymers. Since these resins have a structure similar to that of the high thermal conductive filler, in a case where affinity with the filler is high, the resins are crystallized, in the presence of a high thermal conductive filler, on the surface and/or in the vicinity of the high thermal conductive filler, or even if crystallization is not attained as a whole system, the resins have high compatibility with the high thermal conductive filler having a similar structure, and thus the resins are favorably in close contact with the filler. Therefore, the resins are preferable since they can increase the electrical conductivity or insulating properties and thermal conductivity and can control the coefficient of thermal expansion without significantly impairing mechanical characteristics, by fixing the filler between fillers on the surface and/or in the vicinity of the filler. Although crystallization frequently occurs at micro units and the melting point can be confirmed by aging, in a case where the melting point cannot be confirmed, the deflection temperature under load can be measured and used as an indication.

Examples of the uncrosslinked elastomer include known elastomers including thermoplastic elastomers having aromatic substituents and/or crystalline olefin moieties, such as polystyrene-based, polyolefin-based, polyurethane-based, polyester-based, polyamide-based, polybutadiene-based, polyisoprene-based, silicone-based, and fluorine-based elastomers; and graft copolymers containing olefin-based polymer segments formed from α-olefin monomers and vinyl-based polymer segments formed from vinyl-based monomers.

Examples of the uncured thermosetting resin include known thermosetting resin precursors such as an unsaturated polyester resin, a vinyl ester resin, an epoxy resin, a phenol (resol type) resin, a urea/melamine resin, a polyimide resin, a benzoxazine resin, and mixture thereof, all of which have aromatic substituents. Since the thermosetting resin precursors are usually oligomers having small molecular weights, in the case of using the precursors in combination with thermoplastic polymers and/or thermoplastic elastomers having large molecular weights, fluidity in the system is increased before curing, thereby increasing penetrability of the polymer in between the filler layers. Further, adhesiveness between fillers or between different kinds of materials is enhanced by the functional groups formed along with the curing reaction.

The thermoplastic resin, the uncrosslinked elastomer, and the uncured thermosetting resin described above, all of which have crystallinity and/or aromaticity, may be copolymers or modification products, and may also be a resin obtained by blending two or more kinds thereof. Further, for an enhancement of impact resistance, a resin obtained by adding an elastomer or a rubber component to the thermosetting resin may also be used.

Among uncured thermosetting resins, particularly, a benzoxazine resin has excellent thermal resistance, and since curing proceeds as a result of an addition reaction, volatile side products are not generated. Further, the reaction also proceeds in the absence of catalyst, and a uniform and compact resin phase can be formed, which is preferable. Furthermore, when the benzoxazine resin is used in combination with an epoxy resin, the benzoxazine resin acts as a curing accelerator for the epoxy resin, and defects of the epoxy resin in terms of thermal resistance, strength, and the like can be compensated.

The benzoxazine is a compound having a dihydro-1,3-benzoxazine ring (hereinafter, also simply referred to as "oxazine ring"), and is a condensate of amines, phenols, and formaldehydes. Usually, the chemical structure of benzoxazine to be produced is determined by substituents, kinds, and the like of phenols, amines, and the like, which are reaction raw materials thereof. The benzoxazine used in the present invention may be any derivative of an "oxazine ring" and is not particularly limited, but a compound having at least two oxazine rings in one molecule is preferred. The reason for this is that the crosslinking density is increased and superior results such as an improvement in thermal resistance are obtained. Specific examples of the benzoxazine include Pd type benzoxazine and Fa type benzoxazine manufactured by SHIKOKU CHEMICALS CORPORATION, and the like.

As the amines for deriving benzoxazine having at least two oxazine rings, diamines can be used. Examples of the diamines include 4,4'-oxydianiline, 4,4'-diaminodiphenylmethane, para-diaminobenzene, compounds obtained by substituting the foregoing compounds with an alkyl group, an alkoxy group, a halogen, an aromatic hydrocarbon group, or the like, and the like. Among these, it is preferable to use 4,4'-diaminodiphenylmethane.

Examples of phenols include, as monovalent phenols, phenol, cresol, xylenol, naphthol, and the like; and as polyvalent phenols, bisphenols; and compounds obtained by substituting the foregoing compounds with an alkyl group, an alkoxy group, a halogen, an aromatic hydrocarbon group, and the like. Specific examples of the bisphenols include bisphenol A, bisphenol F, bisphenol S, and the like. Among these, it is preferable to use phenol and bisphenol.

Regarding formaldehydes, formaldehyde (aqueous solution), para-formaldehyde, and the like are used. Among these, it is preferable to use formaldehyde.

In order to obtain benzoxazine from the amines, phenols, formaldehydes as described above, a wide variety of known methods can be employed.

A benzoxazine having at least two oxazine rings can be produced by a method of allowing a diamine, a phenol, and a formaldehyde to react, a method of allowing a bisphenol, a primary amine, and a formaldehyde to react, or the like.

The organic polymer particles formed from a thermoplastic resin, a thermoplastic elastomer, and/or a thermosetting resin are uncrosslinked/uncured particles in the mixture. Further, as will be described, when the mixture is molded by heating under pressure, the thermoplastic resin may be crosslinked, and the thermoplastic elastomer or thermosetting resin is usually crosslinked/cured and then used.

Among these organic polymer particles, for organic polymer particles that have high thermal resistance, strongly fix the filler particle between fillers, and enhance various physical properties such as heat conductivity and electrical characteristics, polyethylene terephthalate, polybutylene terephthalate, polyphenylene sulfide, polycarbonate, polyamide, polypropylene, polyethylene, and benzoxazine are suitable. When the various polymer particles described above are used in combination in accordance with the purpose of use, the features of organic polymers can be exhibited at the maximum.

[High Thermal Conductive Filler Particles]

The high thermal conductive filler particles used in the present invention contain filler particles having a graphite-like structure, and are preferably filler particles alone exhibiting a thermal conductivity of 10 W/mK or more. The average particle size thereof is 1 to 2000 μm and preferably 3 to 200 μm. When the average particle size of the high thermal conductive filler particles is 1 μm or more, the surface area is decreases, and the loss of heat and electrical conduction at the filler interface can be reduced. On the other hand, when the average particle size of the thermal conductive filler is 2000 μm or less, it is preferable because defective dispersion is not likely to occur. In the present invention, high thermal conductive filler particles other than the filler particles having a graphite-like structure can be concurrently used, and examples thereof include ceramic filler particles and metal filler particles which are typically used and have high thermal conductive properties.

The filler particles having a graphite-like structure used in the present invention are an anisotropic material, usually have sliding properties, and serve for prevention of breakage or cracks at an interface between a coil, a substrate, or the like and a metal when mechanical impact is applied by vibration, thermal cycles, and the like. As the filler particles having a graphite-like structure, known thermal conductive fillers having a graphite-like structure which are used in the field of molding and are formed from black leads (synonym for graphite) that usually have electrical conductivity, such as natural graphite such as scale-like graphite, bulk graphite, and soil graphite, and artificial graphite; thermal conductive ceramics that usually have insulating properties, such as hexagonal boron nitride, hexagonal silicon carbide, and hexagonal silicon nitride; sulfides such as molybdenum disulfide and tungsten disulfide; and mixtures thereof, can be used without any particular limitations. In general, a material having an electrical conductivity of $10^6$ to $10^2$ $(\Omega cm)^{-1}$ is called a conductor, a material having an electrical conductivity of 10 to $10^{-7}$ $(\Omega cm)^{-1}$ is called a semiconductor, and a material having an electrical conductivity of $10^{-10}$ to $10^{-18}$ $(\Omega cm)^{-1}$ is called an insulator, and among the aforementioned fillers, scale-like graphite, artificial graphite, and hexagonal boron nitride are particularly preferred since they produce high thermal conductive materials having high electrical conductivity or high insulating properties, respectively.

The scale-like graphite is scale-shaped graphite produced mainly from mines in China, the United States, India, Brazil, and the like and having a large aspect ratio, and in general, larger scales are associated with higher thermal resistance. Graphite having an average particle size of about 8 to 200 μm and a carbon content of 85 to 99% is frequently sold in the market, and this graphite is anisotropic but has a high thermal conductivity of 200 W/mK or more.

Artificial graphite is black leads obtained by molding a mixture of powdered cokes and pitch, and artificially developing crystals through a high temperature calcination process at about 3000° C., and has fewer impurities and high hardness.

Hexagonal boron nitride is a white powder having a scale-like crystal structure resembling graphite, and is a chemically stable material called "white graphite." Hexagonal boron nitride is a material having excellent thermal conductivity, thermal resistance, corrosion resistance, electrical insulating properties and lubricating/mold releasing properties, and is widely used as an additive material in various matrices. Thus, known materials can be used without any change. A scale-like form or a polygonal plate form is generally used, and there are also available aggregate powders in which primary particles are compositely aggregated. Although the substance is anisotropic, a molded body thereof has a high bulk thermal conductivity of about 60 W/mK.

As high thermal conductive filler particles other than the filler particles having a graphite-like structure, there are mentioned ceramic filler particles, which are usually used as an isotropic insulating material, such as aluminum nitride, aluminum oxide (also referred to as alumina), magnesium oxide (also referred to as magnesia), beryllium oxide (also referred to as beryllia) crystalline silica, and cubic boron nitride, and mixtures thereof; and metal filler particles, which are usually used as a conductive material, such as silver, copper, aluminum, zinc, nickel, iron, tin, and a copper alloy, and mixtures thereof, all of which are used as a high thermal conductive filler. Usually, combinations of these high thermal conductive filler particles can sufficiently exhibit respective properties when insulating fillers or conductive fillers are used, which is preferable. Among these, as an insulating material, for use in combination with hexagonal boron nitride, magnesium oxide that is soft and does not damage a coil portion is particularly preferred.

For high thermal conductive filler particles including lumpy objects having large particle sizes, it is preferable to use the filler after pretreating the filler in advance by pulverization and/or crushing, classification, and the like, and adjusting the particles to a desired average particle size. Known methods for promoting an increase in thermal conductivity by concurrently using high thermal conductive filler particles having different particle sizes or controlling the filler shape can also be used.

(Method for Preparing Powder Composition)

The powder composition according to the present aspect can be prepared by pulverizing organic polymer particles containing thermoplastic polymer particles and high thermal conductive filler particles which contain filler particles having a graphite-like structure as necessary, and then mixing these components. However, when mixing is conducted by using excessively large force, micronization occurs, and thus surface areas of the high thermal conductive filler particles significantly increase and inhibition of thermal conduction occurs at the particle interfaces, which is not preferable. Thus, in the present aspect, it is preferable to mix the components by a method of uniformly dispersing the high thermal conductive filler in the composition while maintaining the average planar particle size of the filler particles having a graphite-like structure. As the mixing method, a method of using delamination and/or cohesive failure of a filler is preferably used. Incidentally, the ratio of the thermoplastic polymer particles in the organic polymer particles is preferably 20 wt % or more, more preferably 50 wt % or more, and further preferably 80 wt % or more. In addition, the ratio of the filler having a graphite-like structure in the high thermal conductive filler is preferably 20 wt % or more, more preferably 50 wt % or more, and further preferably 80 wt % or more. The reason for this is that, when the ratios thereof are 20 wt % or more, properties of the thermoplastic polymer and the filler having a graphite-like structure can be exhibited.

Examples of the method of mixing the organic polymer particles, the high thermal conductive filler particles, and the like include a method of introducing the materials into a bag or a can and manually mixing the materials; a method of using a tumbler or the like; a method of using a powder mixing machine such as a Henschel mixer, a Super mixer, or a high-speed mixer; a method of using a pulverizing machine such as a jet mill, an impact mill, an attrition mill, an air classification (ACM) mill, a ball mill, a roller mill, a bead mill, a medium mill, a centrifuge mill, a cone mill, a disc mill, a hammer mill, or a pin mill; methods combining these; and the like. The method of using a pulverizing machine is capable of uniform mixing since large forces such as compressive force, shear force, impact force, and frictional force are applied to powder particles, and is preferable for the present invention since the method is capable of micronizing the organic polymer particles or causing a cohesive failure of the filler; however, in the case of using a pulverizing machine having large fracturing force, it is necessary to specially control the pulverizing machine in order to maintain an average planar particle size of the filler particles. In particular, the method of using a ball mill, a roller mill, a bead mill, or a medium mill is particularly preferred in the point of view that the method is capable of maintaining the average planar particle size of the filler particles without special control and micronizing relatively soft organic polymer particles to cause the micronized particles to adhere to the vicinity of the filler particles.

In general, a ball mill is an apparatus for producing a powder dispersed by grinding down a material adhering to ball surfaces using frictional force or impact force, by introducing hard balls made of a ceramic or the like and powders of materials into a cylindrical vessel, and rotating the vessel. It is possible to uniformly disperse components by delamination or cohesive failure while simply and efficiently maintaining the average planar particle size of the filler particles having a graphite-like structure, which is preferable. It is not particularly necessary to strictly control the size or shape of the raw materials used at the time of mixing and pulverization. However, it is preferable to use a size or shape in a preliminarily determined range in order to maintain the product quality.

The mixing time is not particularly limited, but is preferably 0.2 to 15 hours and more preferably 0.5 to 5 hours.

Further, the average particle size of a uniform powder composition (organic polymer particles and high thermal conductive filler particles) obtained by pulverization is preferably 0.5 to 1000 µm, and more preferably 1 to 500 µm. When the average particle size of the composition is 0.5 µm or more, the contact area between fillers is decreased by a decrease in the surface area so that deterioration of thermal conductivity and electrical characteristics caused by the loss induced by contact can be prevented. On the other hand, when the average particle size of the composition is 1000 µm or less, the resin is uniformly dispersed so that a decrease in strength caused by defective contact between the resin and the filler can be prevented. At this time, the high thermal conductive filler according to the present invention is strong against a force applied from a direction perpendicular to the plane and maintains an average planar particle size; however, the cohesive force in all directions of the organic polymer particles is weaker than that of the filler so that the organic polymer particles are micronized to have an average particle size equal to or less than the average particle size of the high thermal conductive filler particles, and the organic polymer particles are in a state of covering the vicinity of the filler.

Regarding the ratios of the organic polymer particles and the high thermal conductive filler particles in the powder composition used in the present invention, with respect to 100 parts by weight of the total amount, the ratio of the organic polymer particles is 5 to 70 parts by weight and preferably 10 to 50 parts by weight, and the ratio of the high thermal conductive filler particles is 30 to 95 parts by weight and preferably 50 to 90 parts by weight. When the ratio of the organic polymer particles is less than 5 parts by weight and the ratio of the high thermal conductive filler particles is more than 95 parts by weight, it is difficult to cover the vicinity of the high thermal conductive filler particles with the organic polymer particles. When the ratio of the organic polymer particles is more than 70 parts by weight and the ratio of the high thermal conductive filler particles is less than 30 parts by weight, the organic polymer particles exist in a large amount in an interface of the high thermal conductive filler particles, and as a result, the connection between the filler particles is inhibited so that a thermal conduction path is difficult to form.

In the powder composition used in the present invention, known additives, reinforcing agents, and/or fillers can be appropriately used as necessary, to the extent that the addition does not cause contradiction to the purpose of the present invention. Examples of the additives may include a mold releasing agent, a flame retardant, an antioxidant, an emulsifier, a softening agent, a plasticizing agent, a surfactant, a coupling agent, a compatibilizer, and the like. Examples of the reinforcing materials may include short fibers formed from glass fibers, carbon fibers, metal fibers, and inorganic fibers. Examples of other fillers may include calcium carbonate (limestone), glass, talc, silica, mica, diamond, carbon nanotube, carbon nanofibers, graphene, ceramic nanofibers, cellulose nanofibers, recycled products obtainable by heat treating carbon fiber that has been used or has become a waste material, and the like.

<Dispersion Liquid Composition>

The dispersion liquid composition according to the present invention is obtained by uniformly dispersing the powder composition by using a liquid reactive dispersing medium and/or a dispersing medium containing a thermoplastic polymer (also abbreviated as "thermoplastic polymer for the dispersing medium") having a deflection temperature under load or a melting point lower than that of the thermoplastic polymer used in the powder composition, has conditions that a thermal conductive infinite cluster exhibiting a thermal conductivity of 1 to 35 W/mK is formed and a concentration of the thermal conductive filler is equal to or more than a percolation threshold, and is excellent in segregation stability.

Since the vicinity of the high thermal conductive filler particles is covered with fine organic polymer particles having a low specific gravity, there are advantages in that sedimentation due to a difference in specific gravity or separation due to strong aggregation of filler particles hardly occurs in the dispersion liquid, and workability is excellent. There is no concern that the dispersion liquid composition is separated at a temperature at the time of molding, cast molding, or potting. The dispersion liquid composition is not separated at the same temperature as described above for 1 hour or longer, and if being separated, it becomes uniform by simple stirring.

The dispersion liquid composition according to the present invention contains, with respect to 100 parts be weight of the powder composition, a reactive dispersing medium and/or a dispersing medium containing a thermoplastic polymer for the dispersing medium in an amount of 25 to 250 parts by weight (corresponding to 80 to 25 wt % in terms of the powder composition concentration), preferably in an amount of 66 to 200 parts by weight (corresponding to 60 to 30 wt % in terms of the powder composition concentration). Similarly to the powder composition, the dispersion liquid composition can also appropriately contain, as necessary, the aforementioned additive, reinforcing agent, and/or filler, and compatibilizer which are well known.

The dispersion liquid composition according to the present invention is necessary to have fluidity at the time of cast molding or potting, and the fluidity (viscosity) at that time can be measured by a rotational viscometer and a capillary viscometer (also referred to a capillary rheometer). The rotational viscometer employs a method of putting a cylindrical rotor in a sample to obtain a viscosity from the rotational speed and torque thereof, and the capillary viscometer employs a method of allowing a sample to flow into a thin nozzle to obtain a viscosity from a difference in pressure between both ends of the nozzle. The dispersion liquid composition according to the present invention has fluidity in which a viscosity in a rotational viscometer is 100 mPa·s or more and a viscosity in a capillary viscometer is 300 Pa·s or less, and the viscosity in the rotational viscometer and the viscosity in the capillary viscometer are preferably 200 mPa·s or more and 250 Pa·s or less and more preferably 300 mPa·s or more and 200 Pa·s or less, respectively. The reason why the rotational viscometer is used for the lower limit and the capillary viscometer is used for the upper limit is that, when fluidity is too high, the outflow quantity in the capillary viscometer becomes too large so that fluidity cannot be measured, and when fluidity is too low, the rotation axis of the rotational viscometer slips so that accurate fluidity cannot be measured. With the viscosity in a range that can be measured by the rotational viscometer, loading (potting) of a resin by potting into a mold can be conducted, and in the viscosity in a range that can be measured by the capillary viscometer, injection into a mold by pressurization such as injection molding can be conducted.

When the curing calorific value of the liquid reactive dispersing medium in the dispersion liquid composition according to the present invention is 200 J/g or more, or the degree of cure thereof is 80% or more, there is no concern that the thermoplastic polymer for the powder composition is softened or melted at the time of molding, is deviated from the vicinity of the high thermal conductive filler particles to flow the thermoplastic polymer into a reactive dispersing medium phase, and thus the thermal conductivity is decreased by the thermoplastic polymer being unevenly distributed as large aggregates, and it is possible to provide a resin material having a high mechanical strength.

For the measurement of the average particle sizes of the organic polymer particles and the high thermal conductive filler particles of the raw material, the powder composition, and the dispersion liquid composition, and the like, known methods such as a dynamic light scattering method, a laser diffraction method, an imaging method using an optical microscope/electron microscope, and a gravity sedimentation method can be used, and the level of delamination can be directly estimated by an optical microscope or an electron microscope, or can be estimated by measuring the thermal conductivity, electrical conductivity, coefficient of thermal expansion, the mechanical characteristics, and the like of molded articles of the powder composition and the dispersion liquid composition. Further, a curing calorific value and a degree of cure of the dispersion liquid composition using a reactive dispersing medium can be obtained using a differential scanning calorimeter (DSC).

Since the thermal conductive filler having a graphite-like structure has a flat shape, when a dispersion liquid molded article is formed, the filler tends to be oriented in the planar direction perpendicular to the pressure direction in such a manner that, particles are oriented along the planar direction and, in the side surface, particles are oriented along the side surface. Therefore, the thermal conductivity and the electrical conductivity in a specimen exhibit anisotropy of about 1.5 to 5.5 times, but in a component with a fin structure, anisotropy is alleviated as a whole. In the present invention, a value of thermal conductivity is measured in a molded article (specimen) obtained by subjecting the dispersion liquid composition to heat press molding. A value showing a thermal conductivity in the planar direction measured by a hot disc method is higher than a value showing a thermal conductivity in the thickness direction measured by a steady method. However, in a case where a resin is loaded in a mold and subjected to molding without pressurization, the thermal conductivity measured by the hot disc method sometimes shows a lower value than that measured by the normal method, and the orientation of the filler greatly depends on whether pressurization is performed at the time of loading and molding a resin into a mold, and anisotropy also depends thereon.

The dispersion liquid composition according to the present invention has a condition that when a filler-loaded high thermal conductive material described later is obtained, in the hot disc method, a thermal conductive infinite cluster exhibiting a thermal conductivity of 1 to 35 W/mK is formed, and this thermal conductivity is preferably 1.5 to 30 W/mK, more preferably 2 to 25 W/mK, and further preferably 3 to 15 W/mK. When this thermal conductivity is 1 W/mK or more, heat generation of the coil portion can be reduced, and when this thermal conductivity is 35 W/mK or less, the viscosity of the dispersion liquid can be adjusted to a level that enables potting or cast molding under pressure to be performed, which is preferable. In addition, the anisotropy of the thermal conductivity of the molded article can be alleviated by using a spherical filler in combination with a flat filler, and controlling molding flow at the time of molding to make orientation random.

Incidentally, the term "infinite cluster" is based on the percolation theory. Here, in general, the "percolation theory" is a theory on how an object substance is connected in a system, and how the features of the connection are reflected in the nature of the system. Specifically, when the filler particles are sufficiently brought into contact with one another to reach the percolation (penetration) threshold, the filler particles are aggregated to a concentration higher than or equal to a particular concentration (threshold) of the thermal conductive filler to form a cluster in which the entire system stretches out (infinite cluster). Then, thermal conductivity is exhibited over the entire system. In order to exhibit thermal conductivity, thermal resistance between fillers is important in addition to contact between the filler particles as described above, and even if the contact is sufficient, when the thermal resistance at the interface is large, high thermal conductivity is not exhibited.

In the present invention, a thermal conductive filler-rich phase and a thermal conductive filler-non-rich phase coexist in a material system, a filler of a thermal conductive filler-rich phase forms an infinite cluster so that a thermal conductivity is exhibited, and thus the threshold is shifted to a low concentration side and as compared to a case where there is no filler-non-rich phase, the filler concentration in the filler-rich phase increases and a high thermal conductivity in the same filler concentration can be exhibited. Further, by the filler-rich phase and the filler-non-rich phase forming a sea-island structure or an entangled network, there are no cracks at an interface between the filler-rich phase and the filler-non-rich phase or an interface between the filler and the resin, and a material being excellent in mechanical strength, thermal cycle properties, and the like can be provided.

In the present aspect, whether or not the dispersion liquid composition has a condition that a thermal conductive infinite cluster is formed can be predicted by measurement of physical property values such as a thermal conductivity of a dispersion liquid composition molded article (filler-loaded high thermal conductive material) and microscopic observation by a scanning electron microscope (SEM), an energy dispersive X-ray analysis (EDX), and a transmission electron microscope (TEM).

[Reactive Dispersing Medium]

The reactive dispersing medium used in the present invention can uniformly disperse the aforementioned powder composition, forms a crosslinked polymer (cured product) by causing a chemical reaction with use of heating, a catalyst, light, a curing agent, a curing accelerator, or the like, and becomes a continuous liquid phase when dispersing the powder composition. As the reactive dispersing medium, an aromatic substituent containing the aforementioned uncured thermosetting resin or a known uncured thermosetting resin irrespective of existence of crystallinity can be used. Specific examples of the uncured thermosetting resin include thermosetting resin precursors such as an epoxy resin, a silicone resin, a benzoxazine resin, an unsaturated polyester resin, a vinyl ester resin, a phenolic resin, a bismaleimide resin, a cyanate ester resin, an isocyanate ester resin, a polyimide resin and resin precursor mixtures thereof. Usually, the reactive dispersing medium is a liquid composition containing a reactive diluent of decreasing a viscosity of the thermosetting resin, a curing agent of forming a crosslinked polymer by reaction with the thermosetting resin, a catalyst of starting and/or promoting a curing reaction of the thermosetting resin, and/or a curing accelerator, and the like.

Regarding the reactive dispersing medium used in the present invention, in order to form a thermal conductive infinite cluster, it is necessary to use an amount of 25 to 250 parts by weight with respect to 100 parts by weight of the powder composition, and when the viscosity of the dispersing medium is too high, the viscosity of the dispersion liquid composition increases so that a uniform composition having fluidity is not obtainable. Therefore, the reactive dispersing medium is usually a liquid at room temperature, and the viscosity of the dispersing medium at a temperature at the time of cast molding or potting is preferably 200 mPa·s or less and more preferably 100 mPa·s or less.

As the epoxy resin, an epoxy resin having at least one epoxy group, preferably at least two epoxy groups, in one molecule is used. Specific examples thereof include phenol-based epoxy resins such as a bisphenol A type epoxy resin, a bisphenol F type epoxy resin, a bisphenol A-D type epoxy resin, a novolac type epoxy resin, and a resol type epoxy resin; glycidyl esters such as polyhydric alcohol; epoxy compounds such as an alicyclic epoxy resin, an amino type epoxy resin, and isocyanurate; and the like. These are used singly or as a mixture thereof, and as necessary, these are used by adding an epoxy-based reactive diluent, an epoxy resin curing agent, a catalyst, an epoxy resin curing accelerator, or the like.

The epoxy-based reactive diluent is to use for decreasing a viscosity of a resin without impairing properties of an epoxy resin, examples thereof include alkyl monoglycidyl ether, alkyl phenol monoglycidyl ether, alkyl diglycidyl ether, and the like, and epoxy-based reactive diluents which are usually used can be used.

The epoxy resin curing agent can form a crosslinked polymer by reaction with an epoxy resin, and a novolac type and/or resol type phenolic resin can be used singly or as a mixture of two or more kinds thereof. Examples of an epoxy resin curing agent other than the phenolic resin include amine-based curing agents such as triethylenetetramine and diaminodiphenylmethane; acid anhydride-based curing agents such as methyltetrahydrophthalic acid; a benzoxazine resin; imidazole; dicyandiamine; and the like, but the epoxy resin curing agent is not limited thereto.

A mixing ratio of the epoxy resin and the epoxy resin curing agent is not particularly problematic as long as it is a range that is usually used, a mixing ratio of the epoxy group and the epoxy resin curing agent in the whole epoxy resin is not particularly problematic as long as it is a range that is usually used, and an equivalence ratio of the epoxy group in the whole epoxy resin and the functional group reacting with the epoxy group in the whole epoxy resin curing agent is preferably 0.1 to 2.0 and more preferably 0.5 to 1.3. With a value in the above-described range, curing performance, thermal resistance, and the like are sufficiently ensured, which is preferable.

The catalyst and/or curing accelerator for the epoxy resin is not particularly limited as long as it is usually used as the catalyst and/or curing accelerator for the epoxy resin, and they can be used singly or as a mixture of two or more kinds thereof. Examples of such a catalyst and/or curing accelerator include imidazoles such as 2-methylimidazole and 2-phenylimidazole; amines such as tributylamine, 2,4,6-tris(dimethylaminomethyl)phenol, and 1,8-diazabicyclo(5,4,0)undecene-7; phosphororganic compounds such as triphenylphosphine; and the like, but the catalyst and/or curing accelerator is not limited thereto. The used amount of such a catalyst and/or curing accelerator is selected to be usually in a range of 0.01 to 10 parts by weight and preferably in a range of 0.1 to 5 parts by weight with respect to 100 parts by weight of the epoxy resin. When the used amount of the curing accelerator is 0.01 part by weight or more with respect to 100 parts by weight of the epoxy resin, a sufficient catalyst or curing promotion effect is obtainable. In addition, when the used amount is 10 parts by weight or less, occurrence of adverse effects such as a decrease in water resistance/thermal resistance, a decrease in moldability, and a decrease in physical properties of a cured product is prevented and this used amount is also preferred in economic terms.

The silicone resin is not particularly limited and a known silicone resin can be used. Examples thereof include alkyl polysiloxanes such as dimethylpolysiloxane and methylphenyl polysiloxane; those which are obtained by adding an alkenyl group, a silanol group, a hydroxy group, a carboxyl group, and the like of those components; modified silicone resins added with epoxy, acryl, urethane, and the like; and the like, and these can be used singly or as a mixture of two or more kinds thereof. Among these, modified silicone resins that can react with other resins and in which a decrease in mechanical characteristics is small are particularly preferred. Low-viscosity types can also be used as a reactive diluent.

As the benzoxazine resin, known benzoxazine including the aforementioned benzoxazine that is used in the powder composition and is a powder at normal temperature can be used, but benzoxazine that can decrease a viscosity of the dispersion liquid composition and has a melting point of 50° C. or lower, for example, Fa type benzoxazine manufactured by SHIKOKU CHEMICALS CORPORATION, and the like are preferred. As a curing accelerator for the benzoxazine resin, known curing accelerators such as an epoxy resin, a phenolic resin, an imidazole catalyst, and an acid catalyst can be used.

The unsaturated polyester resin is produced by diluting and dissolving a reactive monomer mainly such as styrene in an unsaturated polyester, which is produced by polycondensation of an acid (saturated dibasic acid/unsaturated dibasic acid) of a main raw material and glycol, and known unsaturated polyester resins can be used without particular limitation. Further, the vinyl ester resin is produced by diluting and dissolving a reactive monomer mainly such as styrene in a vinyl ester, which is produced by addition reaction of an epoxy resin and a (meth)acrylic acid, and known vinyl ester resins can be used without particular limitation.

The phenolic resin is one of thermosetting resins obtained by condensation polymerization of phenol and formaldehyde under an acid catalyst or an alkali catalyst. By using the acid catalyst, a thermoplastic resin that is called novolac resin is obtained, but since the novolac resin itself is not cured even by heating, in the case of curing the novolac resin alone for use, it is necessary to use a curing agent such as hexamethylenetetramine. When synthesis is performed under an alkali catalyst, a resol resin is obtained. Since the resol resin has an autoreactive functional group, the resol resin can be cured without any change by heating. Further, as mentioned above, the resol resin can be used as a curing agent for an epoxy resin or a benzoxazine resin.

The bismaleimide resin is not particularly limited as long as it is a resin having maleimide groups at both ends of the molecule chain, but further, a resin having a phenyl group is preferred. Specific examples thereof include N,N'-(4,4'-diphenylmethane)bismaleimide, bis(3-ethyl-5-methyl-4-maleimide phenyl)methane, 2,2-bis[4-(4-maleimide phenoxy) phenyl] propane, m-phenylene bismaleimide, p-phenylene bismaleimide, 4-methyl-1,3-phenylene bismaleimide, N,N'-ethylene dimaleimide, N,N'-hexamethylene dimaleimide, and the like, and these can be used singly or in combination of two or more kinds thereof.

The cyanate ester resin is a compound having two or more of cyanate group-OCN (cyanate ester) in the molecule, the isocyanate ester resin is a compound having two or more of isocyanate group-N=CO in the molecule, and known compounds can be used. In general, a compound having a hydroxyl group is used for a curing agent.

As the polyimide resin, there are mentioned one which is obtained by two stages in which tetracarboxylic dianhydride and diamine serving as raw materials are polymerized in equal moles to obtain polyimide acid (polyamic acid) which is a polyimide precursor, and then dehydration/cyclization (imidization) reactions are advanced by heating or using a catalyst and one which is obtained by one stage in which tetracarboxylic dianhydride and diisocyanate ester are reacted to each other, and known polyimide resins can be used.

Requirements with respect to a cast molding resin and a potting material for preventing heat generation of the coil portion are diverse, as mentioned above, such as thermal conductivity, fluidity (viscosity), thermal resistance, mechanical strength, elasticity (toughness), and thermal cycle properties. Therefore, among the aforementioned thermosetting resins, as the reactive dispersing medium, a thermosetting resin configured by a benzoxazine resin and/or a phenol-based epoxy resin, and a modified silicone resin and/or an epoxy-based reactive diluent is preferred. The benzoxazine resin can provide thermal resistance, a mechanical strength, and the like and becomes a curing accelerator for a phenol-based epoxy resin, and the phenol-based epoxy resin is an epoxy resin having a phenol structure, provides thermal resistance and a mechanical strength, and has favorable compatibility with benzoxazine. Since various grades thereof are commercially available, it is easy to cope with diverse physical property requirements. The modified silicone resin is suitable for provision of thermal resistance, elasticity (toughness), and the like, and the epoxy-based reactive diluent contributes to a decrease in viscosity, increases the concentration of the high thermal conductive filler to contribute to an increase in thermal conductivity, and is necessary as a component of an epoxy-based dispersing medium.

Regarding the ratio of each of the thermosetting resins with respect to 100 parts by weight of the reactive dispersing medium, the ratio of the benzoxazine resin is preferably 0 to 60 parts by weight and more preferably 5 to 40 parts by weight, the ratio of the phenol-based epoxy resin is preferably 5 to 60 parts by weight and more preferably 10 to 40 parts by weight, the ratio of the modified silicone resin is preferably 0 to 50 parts by weight and more preferably 5 to 30 parts by weight, and the ratio of the epoxy-based reactive diluent is preferably 5 to 50 parts by weight and more preferably 10 to 30 parts by weight.

In production of the reactive dispersing medium, although not particularly limited, a mixing machine equipped with a stirrer that is generally known and is suitable for a liquid substance can be used, and for uniform mixing, defoaming promotion, and the like, as necessary, mixing can be performed by heating and under vacuum. Further, in these reactive dispersing media, as necessary, similarly to the above-described catalyst, curing agent, and/or curing accelerator, or powder composition, as necessary, known additives, reinforcing agents and/or high thermal conductive fillers, compatibilizers, thermoplastic polymers, and the like can be appropriately used.

[Thermoplastic Polymer for Dispersing Medium]

The melting point of the thermoplastic polymer for the dispersing medium used in the present invention is preferably 100° C. or higher. Further, as long as the deflection temperature under load or the melting point is lower than that of the thermoplastic polymer for the powder composition by preferably 5 to 150° C., more preferably 10 to 100° C., and further preferably 20 to 50° C., known thermoplastic polymers can be used without particular limitation. When a difference in the deflection temperature under load or the melting point therebetween is 5° C. or more, the thermoplastic polymer for the dispersing medium is fluidized without the thermoplastic polymer for the powder composition being dissolved or melted, so that the dispersion liquid composition can be fluidized. In addition, if the difference thereof is 150° C. or less, for example, the melting point of the thermoplastic polymer for the powder composition is 300° C., the melting point of the thermoplastic polymer for the dispersing medium is 150° C. or higher, and a dispersion liquid composition molded article in which thermal resistance, durability, and the like are maintained can be obtained when the thermoplastic polymer for the dispersing medium is solidified, so that the effect of the present invention can be sufficiently exhibited.

As the thermoplastic polymer for the dispersing medium, the aforementioned thermoplastic polymer used as the organic polymer particles is exemplified. Examples thereof include general-purpose resins such as polyethylene, polypropylene, polystyrene, acrylonitrile/styrene resin, acrylonitrile/butadiene/styrene resin, methacrylic resin, and vinyl chloride; general-purpose engineering resins such as polyamide, polyacetal, polybutylene terephthalate, polyethylene terephthalate, polymethylpentene, and polycarbonate; super engineering resins such as polyphenylene sulfide, polyether ether ketone, polyether imide, polyarylate, polysulfone, polyether sulfone, and polyamide; and the like; and mixtures thereof, but the thermoplastic polymer for the dispersing medium is not limited thereto.

In the thermoplastic polymer for the dispersing medium, similarly to the powder composition, as necessary, known additives, reinforcing agents and/or fillers, compatibilizers, and thermosetting resins can be appropriately used.

<Method for Producing Dispersion Liquid Composition>

According to another aspect of the present invention, there is also provided a method for producing a dispersion liquid composition which is excellent in segregation stability. The production method includes a step (1) of obtaining a powder composition, which contains organic polymer particles containing thermoplastic polymer particles, and high thermal conductive filler particles which contain filler particles having a graphite-like structure, by pulverizing 5 to 70 parts by weight of the organic polymer particles and 30 to 95 parts by weight of the high thermal conductive filler particles with respect to 100 parts by weight of the total amount of these components by using a pulverizing machine, which performs grinding with frictional force or impact force, to cause delamination or cohesive failure while maintaining an average planar particle size of the filler particles having a graphite-like structure, in the powder composition, the vicinity of the high thermal conductive filler particles being covered with the micronized organic polymer particles and the covered particles being uniformly dispersed; and a step (2) of uniformly dispersing the powder composition using to 250 parts by weight of a reactive dispersing medium and/or a dispersing medium containing a thermoplastic polymer having a deflection temperature under load or a melting point lower than that of the thermoplastic polymer particles used in the powder composition with respect to 100 parts by weight of the powder composition to prepare a dispersion liquid composition having conditions that a thermal conductive infinite cluster exhibiting a thermal conductivity of 1 to 35 W/mK is formed and a concentration of the high thermal conductive filler is equal to or more than a percolation threshold.

In the steps (1) and (2) in the method for producing a dispersion liquid composition, the aforementioned method in the dispersion liquid composition is appropriately employed.

When the powder composition is dispersed by a dispersing medium, in order to perform uniform mixing, in addition to the mixing machine described in the above description (the method for preparing a powder composition) and other machines, a known stirrer suitable for a dispersing medium to be used, such as a known kneading machine used for melting and dispersing such as a disperser, a kneader, and a single-screw and twin-screw extruder, can be used without no limitation, but it is not preferable to use a pulverizing machine by which the high thermal conductive filler in the powder composition is finely ground, such as a jet mill or an impact mill. In dispersing, it is necessary to uniformly disperse the powder composition not to mix with bubbles, and in order to remove air contained in the dispersion liquid composition and bubbles to be mixed during mixing/dispersing, it is preferable to perform the dispersing under reduced pressure or under vacuum.

The dispersing time is preferably 10 to 600 minutes and more preferably 20 to 180 minutes. When the dispersing time is 10 minutes or longer, the powder composition can be sufficiently dispersed, and when the dispersing time is 600 minutes or shorter, the dispersing is efficient. The dispersing temperature is, in the case of using a reactive dispersing medium as the dispersing medium, a temperature at which the reactive dispersing medium does not cause the chemical reaction, is usually 150° C. or lower and preferably 100° C. or lower, and the dispersing temperature is, in the case of using a thermoplastic polymer for the dispersing medium, a temperature that is equal to or higher than the deflection temperature under load or the melting point of the thermoplastic polymer for the dispersing medium and is equal to or lower than the deflection temperature under load or the melting point of the thermoplastic polymer particles for the powder composition. When the dispersing temperature is equal to or higher than the deflection temperature under load or the melting point of the thermoplastic polymer, the powder composition can be uniformly dispersed. In addition, when the dispersing temperature is equal to or lower than the deflection temperature under load or the melting point of the thermoplastic polymer particles for the powder composition, the thermoplastic polymer particles for the powder composition is not softened or melted at the time of dispersing but can remain in the vicinity of the high thermal conductive filler particles. Further, when the thermoplastic polymer for the dispersing medium is a powder, the thermoplastic polymer for the dispersing medium can be mixed at the time of producing the powder composition, and when the thermoplastic polymer for the dispersing medium is a pellet, the thermoplastic polymer for the dispersing medium can be used by being melted and mixed with an extruder at the time of molding at a temperature equal to or lower than the melting point of the thermoplastic polymer for the powder composition, and a dispersion liquid composition master batch is produced in advance and can also be used as a raw material at the time of molding.

<Filler-Loaded High Thermal Conductive Material>

According to still another aspect of the present invention, there is also provided a filler-loaded high thermal conductive material. The filler-loaded high thermal conductive material is formed by uniformly dispersing a powder composition, which contains organic polymer particles containing thermoplastic polymer particles, and high thermal conductive filler particles which contain filler particles having a graphite-like structure and is obtained by pulverizing 5 to 70 parts by weight of the organic polymer particles and 30 to 95 parts by weight of the high thermal conductive filler particles with respect to 100 parts by weight of the total amount of these components by using a pulverizing machine, which performs grinding with frictional force or impact force, to cause delamination or cohesive failure while maintaining an average planar particle size of the filler particles having a graphite-like structure, in the powder composition, the vicinity of the high thermal conductive filler particles being covered with the micronized organic polymer particles and the covered particles being uniformly dispersed, using 25 to 250 parts by weight of a liquid reactive dispersing medium and/or a dispersing medium containing a thermoplastic polymer having a deflection temperature under load or a melting point lower than that of the thermoplastic polymer used in the powder composition with respect to 100 parts by weight of the powder composition, and by causing a dispersion liquid composition having conditions that a thermal conductive infinite cluster exhibiting a thermal conductivity of 1 to 35 W/mK is formed and a concentration of the high thermal conductive filler is equal to or more than a percolation threshold to react under a condition that the reactive dispersing medium forms a crosslinked polymer, and/or to be fluidized at a temperature that is equal to or lower than a deflection temperature under load or a melting point of the thermoplastic polymer particles used in the powder composition and is equal to or higher than a deflection temperature under load or a melting point of the thermoplastic polymer used in the dispersing medium, then to be molded by heating at a pressure of 0 to 1000 kgf/cm$^2$ and at a temperature equal to or higher than a deflection temperature under load or a melting point of the thermoplastic polymer particles used in the powder composition, and cooled and solidified.

In the powder composition, the dispersing medium, and the dispersion liquid composition in the filler-loaded high thermal conductive material, embodiments described in each section are appropriately applied.

The condition that the reactive dispersing medium forms a crosslinked polymer varies depending on the type of the reactive dispersing medium to be used, the heating temperature, or use of a catalyst, light, a curing agent, and a curing accelerator, and is appropriately determined according to the purpose of use/use application. Usually, the dispersion liquid is loaded in a mold, appropriately controlled to be cured using the aforementioned means at room temperature to a reaction (curing) temperature equal to or lower than the deflection temperature under load or the melting point of the organic polymer particles used in the powder composition, and then heated and molded. The final degree of cure of the reaction is preferably 80% or more. The reason for this is that, when the degree of cure is 80% or more, the contact between the thermal conductive fillers can become dense in the subsequent heating and molding and an effective thermal conduction path can be formed. Further, a method of fluidizing the thermoplastic polymer for the dispersing medium is performed at a temperature that is equal to or lower than the deflection temperature under load or the melting point of the thermoplastic polymer particles used in the powder composition and is equal to or higher than the deflection temperature under load or the melting point of the thermoplastic polymer for the dispersing medium, and usually, the thermoplastic polymer for the dispersing medium is kneaded and loaded in a mold by an extruder or the like, and then heated and molded.

In the heating and molding, the thermoplastic polymer is molded by heating at a temperature equal to or higher than the deflection temperature under load or the melting point of the thermoplastic polymer particles used in the powder composition at a pressured of 0 to 1000 kgf/cm$^2$, cooled, and solidified. As the molding method, known molding methods such as injection molding, extrusion molding, hollow molding, compression molding, transfer molding, powder molding, calender molding, and thermoforming can be used without limitation, and the molding method can be executed by using means respectively suitable for the thermoplastic resin and the thermosetting resin. As the common subject matter, a resin is melted by being applied with heat, shaped, cooled, and solidified. During the molding process, as necessary, the molding can be performed under reduced pressure or under vacuum.

Since the filler-loaded high thermal conductive material of the present invention is configured as described above, at the stage in which the reactive dispersing medium used as the dispersing medium is crosslinked and/or the stage in which the thermoplastic polymer used as the dispersing medium is fluidized, the initial concentration of the high thermal conductive filler, which is a constituent element of the powder composition, in the powder composition is maintained, then at the stage in which the thermoplastic polymer particles, which are other constituent elements of the powder composition, in the organic polymer particles are heated to a temperature that is equal to or higher than the deflection temperature under load or the melting point, micronized thermoplastic polymer particles are softened and/or melted, then at the stage of cooling/solidifying, the filler-rich phase and the filler-non-rich phase are formed, and an advanced thermal conduction path in which the high thermal conductive filler is efficiently connected is formed in the filler-rich phase.

A constituent of the filler-rich phase is determined by affinity of an organic material component (an organic polymer, a reactive dispersing medium, a thermoplastic resin for a dispersing medium, or the like) with respect to the filler and the migratory property of the organic material component to the filler, and the former mainly depends on surface free energy and the latter mainly depends on molecular weight. The surface free energy ($\gamma$) can be obtained by measuring a contact angle of liquid droplet on the solid surface, and known components of two or more liquids and an actual measurement value are assigned to the theoretical formula to solve the theoretical formula so that they can be resolved into a dispersion component ($\gamma^d$) and a polar component ($\gamma^p$). For example, in hexagonal boron nitride, $\gamma^d$=38.3 mJ/m$^2$ and $\gamma^p$=15.3 mJ/m$^2$, in a PPS resin, $\gamma^d$=45.2 mJ/m$^2$ and $\gamma^p$=0.1 mJ·/m$^2$, in nylon 6, $\gamma^d$=27.5 mJ/m$^2$ and $\gamma^p$=26.2 mJ/m$^2$, and in polybenzoxazine, $\gamma^d$=38.7 mJ/m$^2$ and $\gamma^p$=3.0 mJ/m$^2$. By dividing the surface free energy into the dispersion component and the polar component, which component effectively contributes to affinity is found.

The affinity between the filler and the organic material becomes higher as the difference of the surface free energies between both components are minimized, and this is coincident well with empirical rules that similar components are dissolved well and attached well to each other. For example, in the system of hexagonal boron nitride-PPS resin-nylon 6, the polar component term of the surface free energy is dominant, the filler-rich phase has hexagonal boron nitride and nylon 6 in which a difference in surface free energy between them becomes a minimum value as main constituents, and regarding the filler-non-rich phase, a PPS resin is a main constituent. In a case where the thermoplastic resin becomes a filler-non-rich phase, aggregation occurs at the time of melting (and/or softening)-cooling-solidifying and the particle size increases in some cases, but since the thermoplastic resin usually becomes an island part in the sea-island structure, this does not exert significant influence on thermal conductivity, electrical characteristics, and mechanical characteristics. Since the reactive dispersing medium usually has a small molecular weight, the migratory property to the vicinity of the filler is high, and in a case where the affinity with the filler is high, the reactive dispersing medium is particularly easy to become a filler-rich phase. However, the surface free energy changes by the filler being surface-treated or the surface of the filler being oxidized, and the affinity with the organic material component changes. Further, by reaction of the reactive dispersing medium (for example, ring-opening of an oxazine ring or an epoxy group), a polar functional group is generated and the affinity to the filler changes, and thus it is necessary to take these points of view into consideration.

By emergence of the high thermal conductive filler-rich phase as mentioned above, an advanced and effective thermal conduction path is formed, and even when the percolation threshold of the thermal conductivity is decreased and the filler concentration is low, a high thermal conductivity is exhibited. The polymer microstructure (morphology) of each of these filler particle phase, organic polymer phase, and dispersing medium phase can be measured by microscopic observation through SEM, TEM, and EDX analyses of a material (molded article).

In order to obtain excellent properties such as a thermal conductivity, a bending strength, a flexural modulus of elasticity, and impact resistance, it is important that the filler-rich phase and the filler-non-rich phase coexist in a uniform state, a thermal conductive infinite cluster of the filler in the filler-rich phase is formed by softening or melting, cooling, and solidifying. In particular, when a reactive dispersing medium is used as the dispersing medium, in the condition that a crosslinked polymer is formed, it is important that the degree of cure of the reactive dispersing medium is increased and the thermoplastic polymer used in the powder composition is softened or melted.

<Method for Producing Filler-Loaded High Thermal Conductive Material>

According to still another aspect of the present invention, there is also provided a method for producing a filler-loaded high thermal conductive material. The production method incudes a step (1) of obtaining a powder composition, which contains organic polymer particles containing thermoplastic polymer particles, and high thermal conductive filler particles which contain filler particles having a graphite-like structure, by pulverizing 5 to 70 parts by weight of the organic polymer particles and 30 to 95 parts by weight of the high thermal conductive filler particles with respect to 100 parts by weight of the total amount of these components by using a pulverizing machine, which performs grinding with frictional force or impact force, to cause delamination or cohesive failure while maintaining an average planar particle size of the filler particles having a graphite-like structure, in the powder composition, the vicinity of the high thermal conductive filler particles being covered with the micronized organic polymer particles and the covered particles being uniformly dispersed;

a step (2) of uniformly dispersing the powder composition using 25 to 250 parts by weight of a liquid reactive dispersing medium and/or a dispersing medium containing a thermoplastic polymer having a deflection temperature under load or a melting point lower than that of the thermoplastic polymer particles used in the powder composition with respect to 100 parts by weight of the powder composition to prepare a dispersion liquid composition having conditions that a thermal conductive infinite cluster exhibiting a thermal conductivity of 1 to 35 W/mK is formed and a concentration of the high thermal conductive filler particles is equal to or more than a percolation threshold;

a crosslinking step (3) of allowing the dispersion liquid composition to react under a condition that the reactive dispersing medium forms a crosslinked polymer; and/or a fluidizing step (4) of fluidizing the thermoplastic polymer used in the dispersing medium at a temperature that is equal to or lower than a deflection temperature under load or a melting point of the thermoplastic polymer used in the powder composition and is equal to or higher than a deflection temperature under load or a melting point of the thermoplastic polymer used in the dispersing medium;

a step (5) of molding by heating the material formed in the crosslinking step (3) and/or the fluidizing step (4) at a pressure of 0 to 1000 kgf/cm$^2$ and at a temperature equal to or higher than a deflection temperature under load or a melting point of the organic polymer particles; and a step (6) of cooling and solidifying the material formed in the step (5).

In the steps (1), (2), (3), (4), (5), and (6) in the method for producing a filler-loaded high thermal conductive material, the method presented in the section of the filler-loaded high thermal conductive material is appropriately employed.

The condition that the reactive dispersing medium forms a crosslinked polymer can be obtained by measuring a curing exothermic behavior by using a thermogravimetric/differential thermal (TG/DTA) device and a differential scanning calorimeter (DSC). Regarding the curing temperature and the curing time, the optimum condition can be determined while an exothermic peak temperature when the curing temperature and the curing time are measured under a certain temperature increase rate is used as an indicator. In a case where a thermogravimetric decrease at a low temperature during TG analysis is significant, not only a decrease in reaction product occurs but also air bubbles based on volatile components in the cured product are included, so that a decrease in physical properties occurs, which is not preferable. At this time, such a situation can be prevented by defoaming before curing under reduced pressure or decreasing a curing temperature by concurrently using a catalyst, a curing accelerator, or the like. It is preferable that, during the powder composition exists in a solidified form, the dispersion liquid composition is subjected to cast molding to cure the reactive dispersing medium, and as necessary deforming under reduced pressure, is heated to a temperature equal to or higher than the deflection temperature under load or the melting point of the thermoplastic polymer for the powder composition and then under pressure to be molded.

In a case where the thermoplastic polymer is used as the dispersing medium, it is preferable that, during the thermoplastic polymer for the powder composition exists in a solidified form, the dispersion liquid composition is heated at a temperature equal to or higher than the deflection temperature under load or the melting point of the thermoplastic polymer for the dispersing medium to be fluidized and cast molded in a mold, and as necessary, is heated to a temperature equal to or higher than the deflection temperature under load or the melting point of the thermoplastic polymer for the powder composition under reduced pressure for removing air bubbles, and then under pressure to be molded.

The present invention is configured as mentioned above, so that the known molding method and apparatus described in the section of the filler-loaded high thermal conductive material can be used. In the case of utilizing injection molding using a thermoplastic polymer as a dispersing medium, when a raw material is supplied while the dispersion liquid composition is formed into a tablet or pellet in a state where the powder composition maintains the morphology of thermal conductivity, it is easy to supply the raw material to an extruder.

<Molded Article Obtained by Using Filler-Loaded High Thermal Conductive Material>

According to an embodiment of the present invention, there is also provided a molded article containing the above-described filler-loaded high thermal conductive material or a filler-loaded high thermal conductive material produced by the above-described production method, the molded article being used as a high thermal conductive/heat dissipation component and including a sheet, film, or the like.

In production of the molded article, the molding method described in the section of the method for producing a filler-loaded high thermal conductive material can be appropriately applied, and by using a mold to obtain a desired shape, a molded article having a shape according to use application can be easily obtained. By using different materials as molding raw materials, a molded article having a multi-layer structure or a gradient structure, for example, an integral molded article having a two-layer structure in which an insulating dispersion liquid composition is injected to a coil portion of a stator or a reactor necessary for insulating properties and an exterior resin formed from conductive dispersion liquid composition is integrally molded to the outside thereof, or having a gradient structure in which gradient materials each having a different concentration of the high thermal conductive filler are integrally molded is obtained, so that heat generated from the coil portion and the core portion can be efficiently removed.

At this time, it is possible to use known method such as a method in which a stator or a reactor is fixed into a mold, an insulating dispersion liquid composition (interior resin) is injected to a coil portion, after curing by heating, a conductive dispersion liquid composition that is an exterior resin is injected, and the compositions are integrally molded at a temperature equal to or higher than a deflection temperature under load or a melting point of the thermoplastic polymer used in the solid component; a method in which an exterior resin is first molded, and then an interior resin is injection molded; and a method in which an exterior resin is separately molded, and then an exterior resin is fused to the interior resin. At this time, when the same polymer or a polymer having favorable compatibility is used as the thermoplastic polymer used in each of the exterior resin and the interior resin, adhesiveness at the interface between the layers is enhanced, functional properties such as thermal conductivity and durability such as mechanical characteristics and thermal cycles can be enhanced. Alternatively, the insulating properties of the coil are sufficiently secured, and the conductive dispersion liquid composition is used in the interior resin and the exterior resin, so that a decrease in cost can be achieved.

In a preferred embodiment, it is preferable that in a molded article obtained by laminating two layers, a thermal conductivity of one layer of the two layers is 3 to 35 W/mK and the one layer exhibits electrical conductivity having a surface electrical conductivity of 70 $(\Omega cm)^{-1}$ or less, preferably 1 to 70 $(\Omega cm)^{-1}$; whereas, a thermal conductivity of the other layer of the two layers is 1 to 25 W/mK and the other layer exhibits insulating properties having a surface electrical conductivity of $10^{-10}$ $(\Omega cm)^{-1}$ or less. However, even if sufficient insulating properties are secured in a coil or the like, a semiconductor region having a surface electrical conductivity of 0.1 $(\Omega cm)^{-1}$ or less can be used. Further, when the electrical conductivity is 1 $(\Omega cm)^{-1}$ or more, electromagnetic shielding properties are exhibited, and when the electrical conductivity is 70 $(\Omega cm)^{-1}$ or less, the viscosity of the dispersion liquid is decreased to enable the dispersion liquid to be injected under pressure while insulating properties are exhibited, which is preferable.

Since the filler-loaded high thermal conductive material and the molded article according to the present invention are configured as mentioned above, the present invention can exhibit properties inherent in the organic polymer such as lightweight properties, designability, molding processability, cutting processability, integral moldability, dimension stability, and enhancement in physical properties according to use application while taking advantage of properties inherent in the high thermal conductive filler containing the filler having a graphite-like structure to be used, is excellent in thermal conductivity, heat dissipation properties, electrical characteristics, thermal resistance, mechanical characteristics, thermal cycle properties, and the like, and can meet various requirements for final products of electric/electronic equipment, rotating electrical machines, and the like. Other than the molded article, the filler-loaded high thermal conductive material can be used for various use applications that take advantage of fluidity and have a problem of heat dissipation, such as a sheet, an adhesive, grease, and a sealing material, and by packaging of electronic/electric devices, it is possible to provide devices excellent in waterproof property, dustproof property, and the like.

The insulating material using ceramic filler particles or the like can be used in copper foil parts of substrates of electronic/electric devices necessary for insulating properties, parts being in contact with coil portions of stators, reactors, inductors, transformers, or the like, and a sealing material for substrates of power supplies or the like, and the conductive material using graphite particles or the like can be used in splitters, fins, housings, and the like which have a high thermal emittance and a high electrical conductivity and release the generated heat to the outside, and can be effectively used as a member/component used in the fields of automobiles, motorcycles, aircrafts, air conditioners, robots, drones, and the like which are required for weight saving, compactification, and the like.

A motor or a power generator relatively rotates a magnetic and a coil to generate driving power or electric power, a stationary side is called a stator, a rotation side is called a rotor, and the stator and the rotor can also be moved in a horizontal direction with the same principle (linear motor). A reactor is a passive element using an inductor (that can accumulate energy in a magnetic field formed by flowing current, usually includes a coil, and is also frequently called a coil), and the reactor is used as components for converters or inverters.

In automobiles, 50 to 150 motors are used in various parts related to variable engines or the like, related to vehicle bodies such as a windshield wiper, related to vehicle interiors such as electricity-conducting power steering, for purifiers for power sliding door air or the like, and the like, a power generator for generating power is also used, as the type of motor, a DC blush-attached motor, a PWM-attached DC blush-attached motor, a brushless motor, a stepping motor, and the like are mentioned, and the present invention can be used in stators used therefor. In robots, a DC motor, a DC servomotor, an AC motor, an induction motor, an AC servomotor, a linear motor, a stepping motor, and the like are used, and the present invention can also be used in stators used therefor.

In particular, in the case of using the present invention in a stator of a motor and reactors of an inverter and a converter, the dispersion liquid composition using insulating filler particles such as ceramics can be used as an interior cast molding resin for a coil portion of a stator or a reactor, and the dispersion liquid composition using conductive filler particles such as graphite can be used as an exterior resin for a stator or a reactor. In the case of two-color molding both the compositions, the interface between the both the composition can be strongly bonded by the thermoplastic polymers having favorable compatibility, so that an increase in thermal resistance at the interface and a decrease in mechanical strength can be prevented.

Further, when a strong electromagnetic wave is applied to electronic equipment from the outside, a necessary current is induced to a circuit, an unintended operation occurs so that this unintended operation may inhibit an original operation, which causes malfunction. In recent years, electric/electronic equipment has been widely used in various fields, and measures against noise have become important. A member/component according to the present invention has less noise, and thus can be effectively utilized as EMC (electromagnetic interference) measures for noise prevention, and can be useful for malfunction or the like of sensors that is concerned with widespread of automated driving and IoT.

EXAMPLES

Hereinafter, the present invention will be described in detail by means of Examples, Comparative Examples, Reference Examples, and Comparative Reference Examples, but the scope of the present invention is not intended to be limited to these. Incidentally, production and evaluation of raw materials, dispersion liquid compositions, and molded articles were carried out as follows.

(1) Raw Materials

[Thermoplastic Polymer]

Polyphenylene sulfide (PPS) particles: W203A NATURAL manufactured by KUREHA CORPORATION, white powder, linear form, particle size 100 to 500 μm, specific gravity 1.35, melting point 294° C. (DSC measurement), surface free energy (contact angle measurement): dispersion component ($\gamma^d$)=45.2 mJ/m$^2$ and polar component ($\gamma^p$)=0.1 mJ/m$^2$ Polyamide (nylon 6) particles: manufactured by Ube Industries, Ltd., white powder, average particle size 150 μm, melting point 223° C. (DSC measurement), surface free energy (contact angle measurement): dispersion component ($\gamma^d$)=27.5 mJ/m$^2$ and polar component ($\gamma^p$)=26.2 mJ/m$^2$ Polypropylene (PP) particles: PP Powder PPW-5J manufactured by SEISHIN ENTERPRISE Co., Ltd., white powder, average particle size 5.6 μm, melting point 147° C. (DSC measurement), surface free energy (contact angle measurement): dispersion component ($\gamma^d$)=36.4 mJ/m$^2$ and polar component ($\gamma^p$)=0.2 mJ/m$^2$

[High Thermal Conductive Filler]

Boron nitride: hexagonal BN nitride simple grain type UHP-2 manufactured by Showa Denko K.K., white powder, average particle size 9 to 12 μm, bulk thermal conductivity 60 W/mK (anisotropic filler: planar direction 200 W/mK; depth direction 60 W/mK), surface free energy (contact angle measurement): dispersion component ($\gamma^d$)=38.3 mJ/m$^2$ and polar component ($\gamma^p$)=15.3 mJ/m 2

Aluminum oxide: spherical alumina DAW-45 manufactured by Denka Company Limited, average particle size 42.7 μm, thermal conductivity 40 W/mK (isotropic filler)

Magnesium oxide: RF-98 manufactured by Ube Material Industries, Ltd., white powder, average particle size 50.6 μm, thermal conductivity 45 to 60 W/mK (isotropic filler)

Scale-like graphite: BF-40K manufactured by Chuetsu Graphite Works Co., Ltd., scale-like black powder, average particle size 40 μm, bulk thermal conductivity 150 to 200 W/mK (anisotropic filler: planar direction 200 to 600 W/mK, thickness direction 5 to 12 W/mK), surface free energy (contact angle measurement): dispersion component ($\gamma^d$)=44.4 mJ/m$^2$ and polar component ($\gamma^p$)=4.2 mJ/m$^2$ Graphite scraps: graphite scraps for electrodes manufactured by Showa Denko K.K., particle size 10 to 300 μm (SEM observation)

[Thermosetting Resin]

P-d type benzoxazine resin: P-d type benzoxazine manufactured by SHIKOKU CHEMICALS CORPORATION, pale yellow powder, particle size 0.01 to 0.1 mm (SEM observation), melting point 75° C., curing exothermic peak temperature 242° C. (DSC measurement), curing calorific value 239 J/g F-a type benzoxazine resin: F-a type benzoxazine manufactured by SHIKOKU CHEMICALS CORPORATION, pale yellow block, softening point 30° C. (DSC measurement), curing exothermic peak temperature 241° C. (DSC measurement), curing calorific value 220 J/g, surface free energy of cured product (contact angle measurement): dispersion component ($\gamma^d$)=38.7 mJ/m$^2$ and polar component ($\gamma^p$)=4.2 mJ/m$^2$ Phenol-based epoxy resin: bisphenol F type liquid epoxy resin EPICLON830 manufactured by DIC Corporation, epoxy equivalent 165 to 177 g/eq, transparent liquid, viscosity 3000 to 4000 mPa·s (25° C.), specific gravity 1.19 (25° C.)

Epoxy-based reactive diluent: GLYCIROL ED-503G (chemical name 1,6-hexanediol diglycidyl) manufactured by ADEKA Corporation, transparent liquid, epoxy equivalent 135 g/eq, viscosity 15 mPa·s (25° C.), specific gravity 1.08 (25° C.)

Epoxy-modified silicone resin: silicone resin having both ends modified with epoxy X-22-163 manufactured by Shin-Etsu Chemical Co., Ltd., epoxy equivalent 200 g/eq, transparent liquid, viscosity 15 mm$^2$/s (25° C.), specific gravity 1.00 (25° C.)

Amine-modified silicone resin: silicone resin having both ends modified with amine X-22-161B manufactured by Shin-Etsu Chemical Co., Ltd., functional group equivalent 1500 g/eq, transparent liquid, viscosity 55 mm$^2$/s (25° C.), specific gravity 0.97 (25° C.)

Catalyst: imidazole-based catalyst 2E4MZ-A manufactured by SHIKOKU CHEMICALS CORPORATION, white powder (2) Measurement of Physical Properties of Dispersion Liquid Composition

[Fluidity Test]

Viscosity (mPa·s) by rotational viscometer: A viscosity was measured according to JIS K7117-1 (1999) by using a digital (rotational) viscometer DV2T (manufactured by Brookfield) by the following Equation (1) while changing the rotational speed of a spindle at 100° C., and in a relation between a viscosity (mPa·s) and a shear velocity (1/s), the viscosity after the numerical value was stable was read and obtained.

$$\eta = Ka \times (T/\omega) \tag{1}$$

Here, η: viscosity (mPa·s) of the dispersing medium and the dispersion liquid, Ka: apparatus constant (rad/cm$^2$), ω: angular velocity (rad/s), and T: torque ($10^{-7}$ N·m) acting on the spindle. Viscosity (mP·s) by capillary viscometer: A thermal fluidity was evaluated using a capillary rheometer (Flowtester (CFT-500 type) manufactured by SHIMADZU CORPORATION. 2.5 to 3.5 g of a sample was loaded in a cylinder having a cross-sectional area of 1 cm$^2$ by using a nozzle having a caliber of 1 mm and a length of 1 mm, a piston was inserted, and maintained for 2 minutes at 170° C.

in the case of the dispersing medium being polypropylene, 260° C. in the case of the dispersing medium being nylon, and 100° C. in the case of the dispersing medium being a thermosetting resin (reactive dispersing medium), a volume (Q) of the sample flowing out per unit time when being applied with a load of 50 to 500 kg was obtained, and a shear velocity (Dω) and a viscosity (η) were obtained by the following Equations (3) and (2), respectively. Since the viscosity increases as the load increases but the dispersing medium is separated when the load is low, the viscosity at a load of 300 kg was employed.

$$\eta = \pi \times R^4 \times P/(8 \times L \times Q) \quad (2)$$

$$D\omega = 4 \times Q/(\zeta \times R^3) \quad (3)$$

Here, η: viscosity (poise (1 cP=1 mPa·s)) of the dispersion liquid, Dai: shear velocity (1/s), R: nozzle radius (cm), P: load pressure (dyne/cm² (1 dyne=1.02 kgf)), L: nozzle length (cm), and Q: flow value (ml/s).

[Curing and Exothermic Test]

Curing exothermic peak temperature and calorific value: The exothermic behaviors of the dispersing medium and the dispersion liquid composition at a heating rate of 10° C./min under a nitrogen atmosphere were measured using a differential scanning calorimeter (DSC-60A Plus) (manufactured by SHIMADZU CORPORATION) to obtain a curing exothermic peak temperature, a calorific value (J/g), and a degree of cure (%), and the obtained values were regarded as indicators of curing temperatures of the dispersing medium and the dispersion liquid composition.

[Measurement of Melting Point of Thermoplastic Polymer]

Melting point: The thermal behaviors of the powder composition, the dispersing medium, and the dispersion liquid composition at a heating rate of 10° C./min under a nitrogen atmosphere were measured using the differential scanning calorimeter, a melting point (° C.) of the thermoplastic polymer was obtained from the endothermic peak temperature, and the existence of the thermoplastic polymer was confirmed.

[Segregation Stability Test]

Segregation stability test of dispersion liquid using reactive dispersing medium: 100 g of the dispersion liquid was weighed in a plastic container having an inner diameter of 62 mm (interior volume 140 ml) and left to stand still in a high-temperature tank set to 100° C. for 8 hours, a volume percentage of an upper separated layer (mainly the dispersing medium) was obtained, and thus a separation degree (%) was obtained.

Segregation stability test of dispersion liquid using thermoplastic polymer as dispersing medium: 5 g of the dispersion liquid was weighed in a glass test tube having an inner diameter of 12.5 mm (interior volume 15 ml) and left to stand still in a high-temperature tank set to 160° C. in the case of the dispersing medium being polypropylene and set to 250° C. in the case of the dispersing medium being nylon for 12 hours, a volume percentage of an upper separated layer (mainly the dispersing medium) was obtained, and thus a separation degree (%) was obtained.

(3) Physical Properties of Molded Article

[Measurement of Thermal Conductivity]

Measurement by hot disc method: The thermal conductivity was measured using a thermal property analyzer of a hot disc method (TPS2500S manufactured by Kyoto Electronics Manufacturing Co., Ltd.). The hot disc method takes consideration of making measurement to the extent that heat generated from a hot disc sensor is transferred to the interior of a specimen, and the heat does not reach to the end of the specimen. Thus, the hot disc method is to measure thermal conductivity (W/mK) in the vicinity of the surface of a specimen to a certain depth. In the case of an anisotropic material, the thermal conductivity in the planar direction can be measured.

Measurement by temperature gradient method: A specimen was sandwiched with aluminum blocks, one was heated from a ceramic heater at a certain heat quantity and the other one was cooled with water set at 25° C. to cause temperature gradient, and then a thermal conductivity (W/mK) was calculated from a difference in temperature between steady heat flow and specimen both ends. In the case of an anisotropic material, the thermal conductivity in the depth direction can be measured.

[Measurement of Electrical Conductivity]

The electrical conductivity (($\Omega$cm)$^{-1}$) at a surface and a cross-section of the specimen was measured according to JIS K7194 (1994) using a low resistivity meter Loresta GP (four-point probe method) (manufactured by Mitsubishi Chemical Analytech Co., Ltd.). The measurement range is $10^{-3}$ to $10^7 \Omega$ and the electrical conductivity of the conductive material can be measured.

The electrical conductivity (($\Omega$cm)$^{-1}$) of the specimen was measured according to JIS K6911 (1995) using a high resistivity meter HIRESTA UX (manufactured by NIHON DENKEI CO., LTD.). The measurement range is $10^4$ to $10^{14} \Omega$ and the electrical conductivity of the insulating material can be measured.

[Thermal Resistance Test]

Measurement of decomposition temperature: A thermogravimetric change from room temperature to 1000° C. at a heating rate of 10° C./min under a nitrogen atmosphere was measured by using TG/DTA DTG-60 (manufactured by SHIMADZU CORPORATION), and a temperature (° C.) when the weight is decreased by 10% was regarded as 10% weight loss temperature and was used as an indicator of thermal resistance.

[Bending Test]

Measurement of bending strength and flexural modulus of elasticity: A molded article was cut to produce a measurement sample having a size of 10 mm in width×4 mm in thickness×40 mm in length, and a bending strength (MPa) and a flexural modulus of elasticity (GPa) were measured according to JIS K7171 (2016) by using a universal testing machine Autograph ABS-X (1 kN) (manufactured by SHIMADZU CORPORATION).

[Impact Resistance Test]

Charpy impact test: A molded article was cut to produce a measurement sample having a size of 80 mm in width×4 mm in thickness×10 mm in length, and the Charpy impact value (kJ/m²) was obtained according to JIS K7111-1 (2012) by using an impact testing machine IT (manufactured by Toyo Seiki Seisaku-sho, Ltd.).

(4) Measurement of Contact Angle and SEM/EDX Analysis

[Measurement of Contact Angle]

Two types of liquids (water and diiodomethane) having a known surface free energy ($\gamma_L$) were added dropwise onto a solid molded article, a contact angle (θ) was measured by using an automatic contact angle measurement apparatus DMe211 manufactured by Kyowa Interface Science Co., Ltd., and a dispersion force component ($\gamma_S^d$) of the solid molded article and a surface free energy of a polar component ($\gamma_S^p$) were obtained by the following equations.

$$W_{SL}=\gamma_L(1+\theta)=2\sqrt{(\gamma_S^d\gamma_L^d)}+2\sqrt{(\gamma_S^p\gamma_L^p)} \quad (4)$$

$$\gamma_S=\gamma_S^d+\gamma_S^p \quad (5)$$

[Measurement of SEM/EDX]

The molded article, which had been subjected to hub polishing in advance, was subjected to SEM/EDX analysis by using a scanning electron microscope (SEM) JSM-IT100 manufactured by JEOL Ltd. under the conditions of sputter deposition (Pt (5 nm)) and an accelerating voltage of 10 kV.

Reference Examples 1 to 8 and Comparative Reference Examples 1 and 2: Preparation Examples of Powder Compositions Filler particles having a graphite-like structure, other high thermal conductive filler particles, and organic polymer particles were accurately weighed in amounts presented in the following Table 1, were introduced into a magnetic pot of a desk type ball mill BM-10 (manufactured by Seiwa Giken Co., Ltd.), and the contents were pulverized and mixed for 4 hours at room temperature by using magnetic balls to thereby obtain a uniform powder composition. A part of the obtained powder composition was taken out and subjected to DSC measurement, and the melting point of the organic polymer particles was obtained from an endothermic peak temperature. The obtained results are presented in the following Table 1. Incidentally, among preparation examples presented in Table 1, examples containing the organic polymer particles were regarded as Reference Examples 1 to 8. In addition, regarding examples not containing organic polymer particles, only compositions were presented and these examples were regarded as Comparative Reference Examples 1 and 2.

TABLE 1

| | Reference Example and Comparative Reference Example | | | | | |
|---|---|---|---|---|---|---|
| | Reference Example 1 | Reference Example 2 | Reference Example 3 | Reference Example 4 | Reference Example 5 | Reference Example 6 |
| Filler particles having graphite-like structure | | | | | | |
| Boron nitride (parts by weight) | 80 | 60 | 60 | 60 | 0 | 0 |
| Scale-like graphite (parts by weight) | 0 | 0 | 0 | 0 | 80 | 20 |
| Graphite scraps (parts by weight) | 0 | 0 | 0 | 0 | 0 | 60 |
| Other high thermal conductive filler particles | | | | | | |
| Magnesium oxide (parts by weight) | 0 | 20 | 20 | 0 | 0 | 0 |
| Aluminum oxide (parts by weight) | 0 | 0 | 0 | 20 | 0 | 0 |
| Organic polymer particles | | | | | | |
| PPS resin (parts by weight) | 20 | 20 | 16 | 20 | 20 | 20 |
| Nylon 6 resin (parts be weight) | 0 | 0 | 0 | 0 | 0 | 0 |
| P-d type benzoxazine (parts by weight) | 0 | 0 | 4 | 0 | 0 | 0 |
| Powder composition | | | | | | |
| Concentration (wt %) of high thermal conductive filler | 80 | 80 | 80 | 80 | 80 | 80 |
| Concentration (wt %) of filler having graphite-like structure | 80 | 75 | 75 | 75 | 80 | 80 |
| Melting point (° C.) of organic polymer | 294 | 294 | 75,294 | 294 | 294 | 294 |

| | Reference Example and Comparative Reference Example | | | |
|---|---|---|---|---|
| | Reference Example 7 | Reference Example 8 | Comparative Reference Example 1 | Comparative Reference Example 2 |
| Filler particles having graphite-like structure | | | | |
| Boron nitride (parts by weight) | 0 | 80 | 100 | 0 |
| Scale-like graphite (parts by weight) | 20 | 0 | 0 | 25 |
| Graphite scraps (parts by weight) | 60 | 0 | 0 | 75 |
| Other high thermal conductive filler particles | | | | |
| Magnesium oxide (parts by weight) | 0 | 0 | 0 | 0 |
| Aluminum oxide (parts by weight) | 0 | 0 | 0 | 0 |
| Organic polymer particles | | | | |
| PPS resin (parts by weight) | 0 | 0 | 0 | 0 |
| Nylon 6 resin (parts be weight) | 20 | 20 | 0 | 0 |
| P-d type benzoxazine (parts by weight) | 0 | 0 | 0 | 0 |
| Powder composition | | | | |
| Concentration (wt %) of high thermal conductive filler | 80 | 80 | 100 | 100 |
| Concentration (wt %) of filler having graphite-like structure | 80 | 80 | 100 | 100 |
| Melting point (° C.) of organic polymer | 223 | 223 | — | — |

Examples 1 to 9: Preparation Examples of Dispersion Liquid Compositions Using Reactive Dispersing Medium as Dispersing Medium The dispersing media (the compositions thereof are presented in the table) were accurately weighed in amounts presented in the following Table 2 and defoamed and mixed at 100° C. using a vacuum stirrer to produce a uniform dispersing medium, and the viscosity in the rotational viscometer was obtained. In addition, a catalyst was uniformly added so as to be wt % presented in the following Table 2 in terms of outer weight % with respect to the dispersing medium and DSC measurement was performed, and a curing calorific value and a curing exothermic peak temperature were obtained. Then, the powder composition (Reference Example 1) presented in Table 2 was defoamed and mixed with the dispersing medium before adding a catalyst at 100° C. using the above-described vacuum stirrer until the concentration of the high thermal conductive filler particles was 40 wt' and using a kneader from the concentration of the high thermal conductive filler particles of 50 wt % to produce a uniform dispersion liquid. The respective dispersion liquids were used as Examples 1 to 9.

The viscosity of each dispersion liquid produced above was measured using a rotational viscometer and/or a capillary viscometer to obtain the viscosity. The viscosity in the rotational viscometer exhibited a thixotropic property, and a viscosity value at a shear velocity of 3.4 $s^{-1}$ at which the viscosity value is stabilized was employed. The viscosity in the capillary viscometer was measured at a load of 300 kg, and the flow value was at around 5 ml/s (at around 50,000 $s^{-1}$ in terms of shear velocity). Further, the dispersing medium added with the catalyst was subjected to the segregation stability test and the DSC measurement at 100° C. for 8 hours to obtain a separation degree, and a melting point of the thermoplastic polymer, curing exothermic peak temperature, and curing calorific value. The obtained results are presented in the following Table 2.

Press molding was performed in such a manner that each dispersion liquid composition of Table 2 which contains a catalyst was inserted into a mold having a size of 100 mm in length×100 mm in width to have a thickness of 10 mm, put in a thermostatic chamber set at 150° C., subjected to preliminary curing for about 20 minutes, then subjected to curing reaction at a mold setting temperature of 170° C. for 4 hours under a pressure of 0 to 3 MPa using a vacuum heat press machine to increase a degree of cure, then heated to a mold setting temperature of 300° C. at a rate of 5° C./min under a pressure of 0 to MPa (0 to 102 kgf/cm²), and cooled and solidified after being maintained for 30 minutes. From the obtained molded article, the thermal conductivity by the hot disc method and the temperature gradient method, the electrical conductivity by a high resistance measurement apparatus, a 10% weight loss temperature by TG, the bending strength, the flexural modulus of elasticity, and the Charpy impact value were obtained. The results thereof are presented in the following Table 2.

TABLE 2

|  | Example and Comparative Example | | | | |
|---|---|---|---|---|---|
|  | Example 1 | Example 2 | Example 3 | Example 4 | Example 5 |
| Dispersion liquid composition | | | | | |
| Concentration (wt %) of high thermal conductive filler particles | 30 | 40 | 50 | 60 | 40 |
| Type of powder composition | Reference Example 1 | Reference Example 1 | Reference Example 1 | Reference Example 1 | Reference Example 1 |
| Used amount (parts by weight) of powder composition | 100 | 100 | 100 | 100 | 100 |
| Composition and used amount of dispersing medium | | | | | |
| F-a type benzoxazine (wt %) | 5 | 5 | 5 | 5 | 5 |
| Phenol-based epoxy resin (wt %) | 55 | 55 | 55 | 55 | 73 |
| Epoxy-based reactive diluent (wt %) | 40 | 40 | 40 | 40 | 22 |
| Epoxy-modified silicone resin (wt %) | 0 | 0 | 0 | 0 | 0 |
| Amine-modified silicone resin (wt %) | 0 | 0 | 0 | 0 | 0 |
| Used amount (parts by weight) of dispersing medium | 167 | 100 | 60 | 33 | 100 |
| Physical properties of dispersing medium | | | | | |
| Viscosity (mPa · s) in rotational viscometer | 7 | 7 | 7 | 7 | 7 |
| Catalyst (outer weight % with respect to dispersing medium) | 5.0 | 5.0 | 5.0 | 5.0 | 5.0 |
| Used amount (parts by weight) of catalyst | 8.3 | 5.0 | 3.0 | 1.7 | 5.0 |
| Curing calorific value (J/g) in DSC | 268 | 268 | 268 | 268 | 270 |
| Curing exothermic peak temperature (° C.)✕ in DSC | 157; 266 | 157; 266 | 157; 266 | 157; 266 | 157; 249 |
| Means for producing dispersion liquid | Vacuum stirrer | Vacuum stirrer | Kneader | Kneader | Vacuum stirrer |
| Physical properties of dispersion liquid composition | | | | | |
| Viscosity (mPa · s) in rotational viscometer | 560 | 17,500 | — | — | 17,000 |
| Viscosity (Pa · s) in capillary viscometer | 140 | 145 | 150 | 155 | 147 |
| Separation stability test at 100° C. (separation degree %) | 0 | 0 | 0 | 0 | 0 |
| Melting point (° C.)✕ of thermoplastic polymer | 294 | 294 | 294 | 294 | 294 |
| Degree of cure (%) at 170° C. | 77 | 74 | 65 | 55 | 75 |
| Degree of cure (%) at 270° C. | 99 | 99 | 99 | 99 | 99 |
| Physical properties of dispersion liquid composition molded article | | | | | |
| Thermal conductivity (W/mK) by hot disc method | 2.9 | 4.0 | 14 | 18 | 3.9 |
| Thermal conductivity (W/mK) by temperature gradient method | 1.8 | 2.2 | 6.9 | 8.8 | 2.3 |

TABLE 2-continued

|  |  |  |  |  |  |
|---|---|---|---|---|---|
| Anisotropy in thermal conductivity | 1.6 | 1.8 | 2.0 | 2.1 | 1.7 |
| Electrical conductivity (($\Omega$cm)$^{-1}$) | <10$^{-14}$ | <10$^{-14}$ | <10$^{-14}$ | <10$^{-14}$ | <10$^{-14}$ |
| 10% weight loss temperature (° C.) | 399 | 403 | 412 | 413 | 402 |
| Bending strength (MPa) | 40 | 38 | 35 | 34 | 42 |
| Flexural modulus of elasticity (GPa) | 3.9 | 5.4 | 7.7 | 8.6 | 5.8 |
| Charpy impact strength (kJ/m$^2$) | 1.3 | 1.2 | 1.1 | 1.0 | 1.1 |

| | Example and Comparative Example | | | |
|---|---|---|---|---|
| | Example 6 | Example 7 | Example 8 | Example 9 |
| Dispersion liquid composition | | | | |
| Concentration (wt %) of high thermal conductive filler particles | 40 | 40 | 40 | 40 |
| Type of powder composition | Reference Example 1 | Reference Example 1 | Reference Example 1 | Reference Example 1 |
| Used amount (parts by weight) of powder composition | 100 | 100 | 100 | 100 |
| Composition and used amount of dispersing medium | | | | |
| F-a type benzoxazine (wt %) | 11 | 22 | 5 | 5 |
| Phenol-based epoxy resin (wt %) | 67 | 56 | 55 | 55 |
| Epoxy-based reactive diluent (wt %) | 22 | 22 | 20 | 20 |
| Epoxy-modified silicone resin (wt %) | 0 | 0 | 20 | 0 |
| Amine-modified silicone resin (wt %) | 0 | 0 | 0 | 20 |
| Used amount (parts by weight) of dispersing medium | 100 | 100 | 100 | 100 |
| Physical properties of dispersing medium | | | | |
| Viscosity (mPa · s) in rotational viscometer | 11 | 30 | 7 | 10 |
| Catalyst (outer weight % with respect to dispersing medium) | 5.0 | 5.0 | 5.0 | 1.0 |
| Used amount (parts by weight) of catalyst | 5.0 | 5.0 | 5.0 | 1.0 |
| Curing calorific value (J/g) in DSC | 266 | 255 | 260 | 263 |
| Curing exothermic peak temperature (° C.)✕ in DSC | 158; 263 | 159; 274 | 157; 265 | 154; 266 |
| Means for producing dispersion liquid | Vacuum stirrer | Vacuum stirrer | Vacuum stirrer | Vacuum stirrer |
| Physical properties of dispersion liquid composition | | | | |
| Viscosity (mPa · s) in rotational viscometer | 21,500 | 26,500 | 15,200 | 20,400 |
| Viscosity (Pa · s) in capillary viscometer | 150 | 158 | 140 | 147 |
| Separation stability test at 100° C. (separation degree %) | 0 | 0 | 0 | 0 |
| Melting point (° C.)✕ of thermoplastic polymer | 294 | 294 | 294 | 294 |
| Degree of cure (%) at 170° C. | 74 | 73 | 70 | 82 |
| Degree of cure (%) at 270° C. | 99 | 99 | 99 | 99 |
| Physical properties of dispersion liquid composition molded article | | | | |
| Thermal conductivity (W/mK) by hot disc method | 3.8 | 4.2 | 4.4 | 4.0 |
| Thermal conductivity (W/mK) by temperature gradient method | 2.1 | 2.5 | 2.3 | 2.1 |
| Anisotropy in thermal conductivity | 1.8 | 1.7 | 1.9 | 1.9 |
| Electrical conductivity (($\Omega$cm)$^{-1}$) | <10$^{-14}$ | <10$^{-14}$ | <10$^{-14}$ | <10$^{-14}$ |
| 10% weight loss temperature (° C.) | 401 | 402 | 405 | 401 |
| Bending strength (MPa) | 48 | 56 | 35 | 37 |
| Flexural modulus of elasticity (GPa) | 6.0 | 7.3 | 4.0 | 5.2 |
| Charpy impact strength (kJ/m$^2$) | 1.3 | 1.4 | 2.1 | 1.2 |

✕The former is a first peak temperature and the latter is a second peak temperature.

As understood from the results of Examples presented in Table 2, the thermal conductivity was increased with an increase in concentration of the high thermal conductive filler. Further, from the slope of the tangent, it was found that the percolation threshold of the thermal conductivity is between 20 wt % and 30 wt % of the filler concentration and it was found that by covering the vicinity of the filler with fine organic polymer particles, the percolation threshold is shifted to a low concentration side.

FIG. 1 illustrates photographs showing results of SEM observation and N atom mapping of molded articles produced in Example 2 (filler concentration 40 wt %) and Example 4 (filler concentration 60 wt %). Regarding the systems of these examples, filler particles having a graphite-like structure are formed from hexagonal boron nitride (containing N atom), organic polymer particles are formed from a PPS resin (containing C and S atoms), and a reactive dispersing medium is formed from a benzoxazine resin (containing C, N, and O atoms), a phenol-based epoxy resin (containing C and O atoms), and an epoxy reactive diluent (containing C and O atoms).

Herein, black island parts of FIG. 1 can be confirmed to be a PPS resin from the S atom mapping and form filler-non-rich phases. White parts of FIG. 1 are hexagonal boron nitride and a benzoxazine resin which contain N atoms (the content is predominantly large in the former), but become sea parts (continuous phases) which are micro-dispersed and form filler-rich phases. From C and O atom mappings, it is found that the hexagonal boron nitride and the reactive dispersing medium are entangled and micro-dispersed, and from comparison between the upper diagram and the lower diagram, it is found that by increasing the filler concentration, the N atom concentration, that is, the concentration of hexagonal boron nitride is significantly increased. The PPS resin which has poor compatibility with hexagonal boron nitride (a large difference in surface free energy) forms an island part as a filler-non-rich phase and there are observed a lot of island parts having a length (diameter) of 50 μm or more. This island part becomes larger than the particle size of the PPS resin in the powder composition and is considered to be melted and aggregated/solidified.

Comparative Examples 1 to 5

The experiment was conducted according to Example 1 mentioned above, except that the concentration of the high thermal conductive filler particles, the type of powder composition (Reference Example 1 or Comparative Reference Example 1) and the used amount thereof, and the used amounts of the dispersing medium and the catalyst were changed as the following Table 3. The results thereof are presented as Comparative Examples 1 to 5 in the following Table 3.

was increased with an increase in concentration of the high thermal conductive filler. Further, from the slope of the tangent, it was found that the percolation threshold of the thermal conductivity exists between filler concentrations of 20 wt % to 30 wt %, and it is found that, when the filler concentration becomes 70 wt %, the powder composition and the dispersing medium are difficult to uniformly mix (Comparative Example 2) and fluidity of the dispersion liquid cannot be provided. Further, based on comparison between Examples 2 and 3 and Comparative Examples 3 and 4, it is found that the present invention is excellent in segregation stability, thermal conductivity, bending strength, flexural modulus of elasticity, and Charpy impact strength.

Examples 10 to 17 and Comparative Examples 6 and 7: Influence of Powder Composition on Dispersion Liquid Composition The experiment was conducted according to Example 1 mentioned above, except that the concentration of the high

TABLE 3

|  | Example and Comparative Example | | | | |
|---|---|---|---|---|---|
|  | Comparative Example 1 | Comparative Example 2 | Comparative Example 3 | Comparative Example 4 | Comparative Example 5 |
| Dispersion liquid composition | | | | | |
| Concentration (wt %) of high thermal conductive filler particles | 20 | 70 | 50 | 40 | 50 |
| Type of powder composition | Reference Example 1 | Reference Example 1 | Reference Example 1 | Comparative Reference Example 1 | Comparative Reference Example 1 |
| Used amount (parts by weight) of powder composition | 100 | 100 | 100 | 100 | 100 |
| Composition and used amount of dispersing medium | | | | | |
| F-a type benzoxazine (wt %) | 5 | 5 | 5 | 5 | 5 |
| Phenol-based epoxy resin (wt %) | 55 | 55 | 55 | 55 | 55 |
| Epoxy-based reactive diluent (wt %) | 40 | 40 | 40 | 40 | 40 |
| Epoxy-modified silicone resin (wt %) | 0 | 0 | 0 | 0 | 0 |
| Amine-modified silicone resin (wt %) | 0 | 0 | 0 | 0 | 0 |
| Used amount (parts by weight) of dispersing medium | 300 | 14.3 | 100 | 150 | 100 |
| Physical properties of dispersing medium | | | | | |
| Viscosity (mPa · s) in rotational viscometer | 7 | 7 | 7 | 7 | 7 |
| Catalyst (outer weight % with respect to dispersing medium) | 5.0 | 5.0 | 1.0 | 5.0 | 5.0 |
| Used amount (parts by weight) of catalyst | 15.0 | 0.7 | 1.0 | 7.5 | 5.0 |
| Curing calorific value (J/g) in DSC | 268 | 268 | 24 | 268 | 268 |
| Curing exothermic peak temperature (° C.)[X] in DSC | 157; 266 | 157; 266 | 174; 265 | 157; 266 | 157; 266 |
| Means for producing dispersion liquid | Vacuum stirrer | Kneader (Uniform mixing cannot be performed) | Kneader | Vacuum stirrer | Kneader |
| Physical properties of dispersion liquid composition | | | | | |
| Viscosity (mPa · s) in rotational viscometer | 145 | — | — | 10,400 | — |
| Viscosity (Pa · s) in capillary viscometer | — | — | 150 | 147 | 153 |
| Separation stability test at 100° C. (separation degree %) | 0 | — | 0 | 15 | 10 |
| Melting point (° C.) of thermoplastic polymer | 294 | 294 | 294 | — | — |
| Degree of cure (%) at 170° C. | 75 | — | 10 | 75 | 67 |
| Degree of cure (%) at 270° C. | 99 | — | 65 | 99 | 99 |
| Physical properties of dispersion liquid composition molded article | | | | | |
| Thermal conductivity (W/mK) by hot disc method | 1.0 | — | 1.8 | 2.2 | 5.2 |
| Thermal conductivity (W/mK) by temperature gradient method | 0.7 | — | 1.2 | 1.1 | 2.3 |
| Anisotropy in thermal conductivity | 1.4 | — | 1.5 | 2.0 | 2.3 |
| Electrical conductivity ((Ωcm)$^{-1}$) | <$10^{-14}$ | — | <$10^{-14}$ | <$10^{-14}$ | <$10^{-14}$ |
| 10% weight loss temperature (° C.) | 385 | — | 350 | 400 | 410 |
| Bending strength (MPa) | 47 | — | 28 | 33 | 32 |
| Flexural modulus of elasticity (GPa) | 3.7 | — | 2.5 | 3.6 | 3.5 |
| Charpy impact strength (kJ/m$^2$) | 1.0 | — | 1.8 | 0.8 | 0.7 |

[X]The former is a first peak temperature and the latter is a second peak temperature.

As understood from the results of Examples 1 to 4 and Comparative Examples 1 and 2, the thermal conductivity thermal conductive filler particles, the type of powder composition (Reference Examples 2 to 8 and Comparative Reference Example 2) and the used amount thereof, and the used amounts of the dispersing medium and the catalyst were changed as the following Table 4 and the mold setting temperature in Examples 13 and 17 was changed to 240° C. The results thereof are presented as Examples 10 to 17 and Comparative Examples 6 and 7 in the following Table 4.

TABLE 4

|  | Example and Comparative Example | | | | |
|---|---|---|---|---|---|
|  | Example 10 | Example 11 | Example 12 | Example 13 | Example 14 |
| Dispersion liquid composition | | | | | |
| Concentration (wt %) of high thermal conductive filler particles | 40 | 40 | 40 | 50 | 40 |
| Type of powder composition | Reference Example 2 | Reference Example 3 | Reference Example 4 | Reference Example 8 | Reference Example 5 |
| Used amount (parts by weight) of powder composition | 100 | 100 | 100 | 100 | 100 |
| Used amount (parts by weight) of dispersing medium | 100 | 100 | 100 | 60 | 100 |
| Catalyst (outer weight % with respect to dispersing medium) | 5 | 5 | 5 | 5 | 5 |
| Imidazole A (parts by weight) | 5.0 | 5.0 | 5.0 | 3.0 | 5.0 |
| Physical properties of dispersion liquid composition | | | | | |
| Viscosity (mPa · s) in rotational viscometer | 17,600 | 17,700 | 18,500 | — | 19,800 |
| Viscosity (Pa · s) in capillary viscometer | 147 | 148 | 150 | 157 | 155 |
| Separation stability test at 100° C. (separation degree %) | 0 | 0 | 0 | 0 | 0 |
| Melting point (° C.)[X] of thermoplastic polymer | 294 | 75,294 | 294 | 223 | 294 |
| Degree of cure (%) at 170° C. | 72 | 78 | 78 | 75 | 70 |
| Degree of cure (%) at 270° C. | 99 | 99 | 99 | 99 | 99 |
| Physical properties of dispersion liquid composition molded article | | | | | |
| Thermal conductivity (W/mK) by hot disc method | 3.7 | 3.9 | 3.7 | 13 | 6.5 |
| Thermal conductivity (W/mK) by temperature gradient method | 2.3 | 2.4 | 2.2 | 6.6 | 3.8 |
| Anisotropy in thermal conductivity | 1.6 | 1.6 | 1.7 | 2.0 | 1.7 |
| Electrical conductivity (($\Omega$cm)$^{-1}$) | <10$^{-14}$ | <10$^{-14}$ | <10$^{-14}$ | <10$^{-14}$ | — |
| Electrical conductivity (surface) (($\Omega$cm)$^{-1}$) | — | — | — | — | 0.00033 |
| Electrical conductivity (cross-section) (($\Omega$cm)$^{-1}$) | — | — | — | — | 0.00014 |
| Anisotropy in electrical conductivity | — | — | — | — | 2.4 |
| 10% weight loss temperature (° C.) | 400 | 420 | 402 | 409 | 405 |
| Bending strength (MPa) | 36 | 42 | 35 | 34 | 39 |
| Flexural modulus of elasticity (GPa) | 5.5 | 6.5 | 5.4 | 7.3 | 5.6 |
| Charpy impact strength (kJ/m$^2$) | 1.0 | 1.5 | 0.9 | 1.0 | 1.4 |

|  | Example and Comparative Example | | | | |
|---|---|---|---|---|---|
|  | Example 15 | Example 16 | Example 17 | Comparative Example 6 | Comparative Example 7 |
| Dispersion liquid composition | | | | | |
| Concentration (wt %) of high thermal conductive filler particles | 50 | 40 | 40 | 40 | 50 |
| Type of powder composition | Reference Example 5 | Reference Example 6 | Reference Example 7 | Comparative Reference Example 2 | Comparative Reference Example 2 |
| Used amount (parts by weight) of powder composition | 100 | 100 | 100 | 100 | 100 |
| Used amount (parts by weight) of dispersing medium | 60 | 100 | 100 | 150 | 100 |
| Catalyst (outer weight % with respect to dispersing medium) | 5 | 5 | 5 | 5 | 5 |
| Imidazole A (parts by weight) | 3.0 | 5.0 | 5.0 | 7.5 | 5.0 |
| Physical properties of dispersion liquid composition | | | | | |
| Viscosity (mPa · s) in rotational viscometer | — | 19,900 | 19,500 | 10,600 | — |
| Viscosity (Pa · s) in capillary viscometer | 158 | 156 | 154 | 146 | 149 |
| Separation stability test at 100° C. (separation degree %) | 0 | 0 | 0 | 14 | 8 |
| Melting point (° C.)[X] of thermoplastic polymer | 294 | 294 | 223 | — | — |
| Degree of cure (%) at 170° C. | 63 | 63 | 65 | 72 | 65 |
| Degree of cure (%) at 270° C. | 99 | 99 | 99 | 99 | 99 |
| Physical properties of dispersion liquid composition molded article | | | | | |
| Thermal conductivity (W/mK) by hot disc method | 11 | 6.3 | 6.2 | 4.3 | 7.5 |
| Thermal conductivity (W/mK) by temperature gradient method | 5.3 | 3.7 | 3.6 | 1.7 | 2.9 |
| Anisotropy in thermal conductivity | 2.1 | 1.7 | 1.7 | 2.5 | 2.6 |
| Electrical conductivity (($\Omega$cm)$^{-1}$) | — | — | — | — | — |
| Electrical conductivity (surface) (($\Omega$cm)$^{-1}$) | 0.00086 | 0.00031 | 0.00030 | 0.00015 | 0.00033 |
| Electrical conductivity (cross-section) (($\Omega$cm)$^{-1}$) | 0.00029 | 0.00013 | 0.00011 | 0.00005 | 0.00009 |
| Anisotropy in electrical conductivity | 3.0 | 2.4 | 2.7 | 3.0 | 3.7 |
| 10% weight loss temperature (° C.) | 410 | 403 | 395 | 405 | 415 |
| Bending strength (MPa) | 37 | 39 | 37 | 35 | 34 |
| Flexural modulus of elasticity (GPa) | 7.8 | 5.6 | 5.4 | 3.8 | 3.5 |
| Charpy impact strength (kJ/m$^2$) | 1.3 | 0.9 | 0.8 | 1.0 | 0.8 |

[X]The former is a first peak temperature and the latter is a second peak temperature.

Regarding Examples 10 to 12, the same results as in Example 2 were obtained. Further, regarding Examples 14 to 17, by using graphite as the high thermal conductive filler particles, a molded article exhibited electrical conductivity and had higher thermal conductivity. Based on comparison between Examples 14 and 15 and Comparative Examples 6 and 7, it is found that the present invention is excellent in segregation stability, thermal conductivity, electrical conductivity, and mechanical characteristics.

Examples 18 to 25 and Comparative Examples 8 and 9: Preparation Examples of Dispersion Liquid Compositions Using Thermoplastic Polymer as Dispersing Medium Powder compositions in the types and used amounts presented in the following Table 5 were respectively pulverized and mixed at room temperature with a ball mill for 4 hours to obtain powder compositions. Next, the powder compositions and dispersing media in the types and used amounts presented in the following Table 5 were added to the ball mill and then pulverized and mixed for 2 hours to obtain dispersion liquid compositions, and the dispersion liquid compositions were regarded as Examples 18 to 22. Further, regarding Comparative Examples 8 and 9, powder compositions and dispersing media were put into a ball mill and then pulverized and mixed for 6 hours to obtain dispersion liquid compositions.

Each dispersion liquid composition produced above was loaded in a mold having a size of 40 mm in length×40 mm in width, and heated to a mold setting temperature of 300° C. using a vacuum pressing machine and held for 60 minutes to perform press molding. The physical properties of the dispersion liquid composition and the physical properties of the dispersion liquid molded article were measured according to Example 1, and the results thereof are presented as Examples 18 to 22 and Comparative Examples 8 and 9 in the following Table 5.

Further, 100 parts by weight of the powder composition obtained in Reference Example 7 and the PP resin in an amount presented in Table 5 were kneaded at a temperature equal to or higher than the melting point (147° C.) of the PP resin and equal to or lower than the melting point (223° C.) of nylon 6 using a twin-screw extruder KZW20-30WG manufactured by TECHNOVEL CORPORATION to produce a pellet (dispersion liquid composition), and the pellet was subjected to injection molding at a temperature near the melting point of nylon busing an injection molding machine M-20A-SJC manufactured by Meiki Co., Ltd. (mold clamping force: 20 t; screw diameter: 20 MPa) to obtain a molded article. Two molded articles thus obtained were superimposed, loaded in a mold having a size of 40 mm in length×40 mm in width, heated to a mold setting temperature of 300° C. using a vacuum pressing machine, and held for 60 minutes to perform press molding, thereby obtaining a specimen. The physical properties of the dispersion liquid composition and the physical properties of the dispersion liquid molded article are measured according to Example 1, and the results thereof are presented as Examples 23 to 25 in Table 5.

TABLE 5

| | Example and Comparative Example | | | | | |
|---|---|---|---|---|---|---|
| | Example 18 | Example 19 | Example 20 | Example 21 | Example 22 | Example 23 |
| Dispersion liquid composition | | | | | | |
| Concentration (wt %) of high thermal conductive filler particles | 40 | 50 | 60 | 64 | 60 | 30 |
| Type of powder composition | Reference Example 7 | Reference Example 7 | Reference Example 7 | Reference Example 7 | Reference Example 6 | Reference Example 7 |
| Used amount (parts by weight) of powder composition | 100 | 100 | 100 | 100 | 100 | 100 |
| Type and used amount of dispersing medium | | | | | | |
| Nylon 6 resin (parts be weight) | 0 | 0 | 0 | 0 | 33 | 0 |
| PP resin (parts by weight) | 100 | 60 | 33 | 25 | 0 | 167 |
| Physical properties of dispersion liquid composition | | | | | | |
| Viscosity (mPa · s) in capillary viscometer | 147 | 161 | 168 | 172 | 185 | 141 |
| Melting point (° C.)※ of thermoplastic polymer | 147,223 | 147,223 | 147,223 | 147,223 | 223,294 | 147,223 |
| Separation stability test (separation degree %) | 0 | 0 | 0 | 0 | 0 | 0 |
| Physical properties of dispersion liquid composition molded article | | | | | | |
| Thermal conductivity (W/mK) by hot disc method | 6.6 | 11 | 20 | 26 | 24 | 3.2 |
| Thermal conductivity (W/mK) by temperature gradient method | 4.4 | 6.3 | 12 | 15 | 14 | 1.1 |
| Anisotropy in thermal conductivity | 1.5 | 1.7 | 1.7 | 1.7 | 1.7 | 2.9 |
| Electrical conductivity (surface) $((\Omega cm)^{-1})$ | 0.48 | 1.89 | 21 | 46 | 25 | $<10^{-14}$ |
| Electrical conductivity (cross-section) $((\Omega cm)^{-1})$ | 0.28 | 0.71 | 7.1 | 14 | 7.5 | $<10^{-14}$ |
| Anisotropy in electrical conductivity | 1.7 | 2.7 | 3.0 | 3.3 | 3.3 | — |
| 10% weight loss temperature (° C.) | 429 | 432 | 433 | 434 | 445 | 430 |
| Bending strength (MPa) | 5.9 | 15 | 16 | 18 | 18 | 3.9 |
| Flexural modulus of elasticity (GPa) | 1.7 | 2.7 | 4.3 | 5.5 | 5.4 | 1.6 |

TABLE 5-continued

|  | Example and Comparative Example | | | |
| --- | --- | --- | --- | --- |
|  | Example 24 | Example 25 | Comparative Example 8 | Comparative Example 9 |
| Dispersion liquid composition | | | | |
| Concentration (wt %) of high thermal conductive filler particles | 40 | 50 | 40 | 50 |
| Type of powder composition | Reference Example 7 | Reference Example 7 | Comparative Reference Example 2 | Comparative Reference Example 2 |
| Used amount (parts by weight) of powder composition | 100 | 100 | 100 | 100 |
| Type and used amount of dispersing medium | | | | |
| Nylon 6 resin (parts be weight) | 0 | 0 | 0 | 0 |
| PP resin (parts by weight) | 100 | 60 | 150 | 100 |
| Physical properties of dispersion liquid composition | | | | |
| Viscosity (mPa · s) in capillary viscometer | 147 | 161 | 150 | 157 |
| Melting point (° C.)✕ of thermoplastic polymer | 147,223 | 147,223 | 147 | 147 |
| Separation stability test (separation degree %) | 0 | 0 | 12 | 7 |
| Physical properties of dispersion liquid composition molded article | | | | |
| Thermal conductivity (W/mK) by hot disc method | 4.6 | 11 | 4.5 | 7.8 |
| Thermal conductivity (W/mK) by temperature gradient method | 1.5 | 5.0 | 1.8 | 3.1 |
| Anisotropy in thermal conductivity | 3.1 | 2.2 | 2.5 | 2.5 |
| Electrical conductivity (surface) (($\Omega$cm)$^{-1}$) | $1.2 \times 10^{-8}$ | $8.5 \times 10^{-3}$ | 0.20 | 1.10 |
| Electrical conductivity (cross-section) (($\Omega$cm)$^{-1}$) | $2.4 \times 10^{-9}$ | $2.1 \times 10^{-3}$ | 0.06 | 0.30 |
| Anisotropy in electrical conductivity | 5.0 | 4.0 | 3.3 | 3.7 |
| 10% weight loss temperature (° C.) | 432 | 434 | 415 | 422 |
| Bending strength (MPa) | 4.3 | 10 | 5.1 | 5.6 |
| Flexural modulus of elasticity (GPa) | 2.6 | 5.0 | 1.7 | 2.1 |

✕The former is a first peak temperature and the latter is a second peak temperature.

From Examples 18 to 21, it is found that the thermal conductivity, the electrical conductivity, and the mechanical strength are increased as the concentration of the high thermal conductive filler particles increases, and a thermal conductive infinite cluster is formed. In addition, from comparison between Example 20 and Example 22, it is found that by changing the dispersing medium from the PP resin to the nylon 6 resin, the thermal conductivity, the electrical conductivity, and the mechanical strength are improved. Further, from comparison between Examples 18 and 19 and Comparative Examples 8 and 9, it is found that the present invention is excellent in thermal conductivity, the electrical conductivity, and the mechanical characteristics. Furthermore, from Examples 23 to 25, it was found that by injection molding the dispersion liquid composition, almost the same effect as in heat press molding is obtained and productivity can be significantly improved.

Example 26 and Comparative Example 10: Two-Color Molding Using Insulating/Conductive Material A conductive material dispersion liquid composition (thermal conductivity 24 W/mK, surface electrical conductivity 25 ($\Omega$cm)$^{-1}$) was produced in the similar manner to Example 22, was loaded into a mold having a size of 100 mm in length×100 mm in width to have a depth of 5 mm, and molded according to Example 22. Thereafter, the insulating material dispersion liquid composition obtained in Example 13 (thermal conductivity 13 W/mK, electrical conductivity $10^{-14}$ ($\Omega$cm)$^{-1}$ or less) was loaded into the upper part of the conductive material molded article to have a depth of 5 mm, cured/molded according to Example 13, and then subjected to insulation/conductive material two-color molding. The physical properties of the obtained dispersion liquid composition molded article are presented in the following Table 5 as Example 26. In addition, the experiment was performed in the similar manner to Example 26 using Comparative Example 7 (thermal conductivity 7.5 W/mK, electrical conductivity 1.0 ($\Omega$cm)$^{-1}$) as the insulating material dispersion liquid composition Instead of Example 13. The results thereof are presented in the following Table 6 as Comparative Example 10. Incidentally, the measurement of the thermal conductivity by the hot disc method was performed from both sides of the insulating material and the conductive material, and the measurement of the thermal conductivity by the temperature gradient method was performed by heating from the insulating material side. The measurement of the electrical conductivity on the surface was also performed from both sides of the insulating material and the conductive material, and the measurement of the electrical conductivity on the cross-section was performed by energizing from both sides of the insulating material and the conductive material.

TABLE 6

| | Example and Comparative Example | | | |
|---|---|---|---|---|
| | Example 26 | | Comparative Example 10 | |
| Electrical characteristics of material | Conductive material | Insulating material | Conductive material | Insulating material |
| Dispersion liquid composition | Example 22 | Example 13 | Example 22 | Comparative Example 7 |
| Concentration (wt %) of high thermal conductive filler particles | 60 | 50 | 60 | 50 |
| Physical properties of dispersion liquid composition molded article | | | | |
| Thermal conductivity (W/mK) by hot disc method | | | | |
| From insulating side | | 12 | | 5.0 |
| From conductive side | | 23 | | 22 |
| Thermal conductivity (W/mK) by temperature gradient method | | 10 | | 1.8 |
| Electrical conductivity (surface) (($\Omega$cm)$^{-1}$) | | | | |
| From insulating side | | <$10^{-14}$ | | <$10^{-14}$ |
| From conductive side | | 7.6 | | 0.5 |
| Electrical conductivity (cross-section) (($\Omega$cm)$^{-1}$) | | <$10^{-14}$ | | <$10^{-14}$ |
| Bending strength (MPa) | | 32 | | 18 |
| Flexural modulus of elasticity (GPa) | | 7.0 | | 3.5 |

From comparison between Example 26 and Comparative Example 10, it is found that the present invention is excellent in electrical conductive and mechanical characteristics. Incidentally, in Comparative Example 10, since sufficient bonding cannot be performed at the interface between the insulating material and the conductive material, peeling-off at the interface occurred in the bending test.

Figure 2:
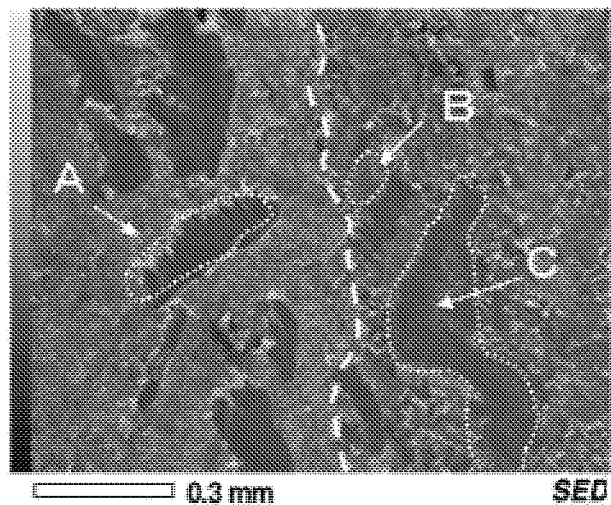
FIG. 2 illustrates a photograph showing a result of SEM observation of a molded article produced in Example 26.

FIG. 2 illustrates a photograph showing a result of SEM observation of a molded article produced in Example 26. The dashed line at the center indicates the interface between the insulating material (Example 13) and the conductive material (Example 22), the left half corresponds to the insulating material, and the right half corresponds to the conductive material. From the SEM photograph, it was found that there are distinctive agglomerations of A, B, and C.

Figure 3:
FIG. 3 illustrates photographs showing results of S, C, N, and O atom mapping of a molded article produced in Example 26.
Figure 3:
Figure 3:
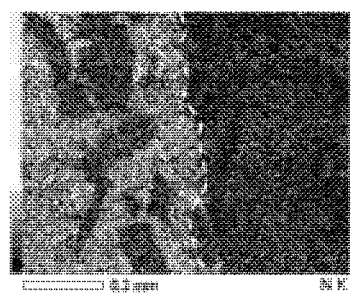
Figure 3:
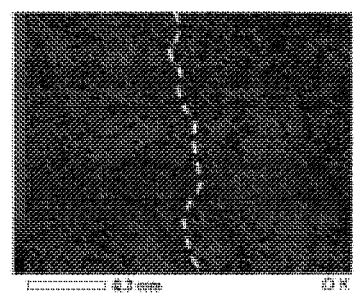

FIG. 3 illustrates photographs showing results of S, C, N, and O atom mapping obtained by EDX analysis in the SEM photograph shown in FIG. 2. The insulating material is formed from hexagonal boron nitride (containing N atom) as the filler having a graphite-like structure and a nylon 6 resin (containing C, O, and N atoms) as the organic polymer particles, and the reactive dispersing medium is formed from a benzoxazine resin (containing C, N, and O atoms), a phenol-based epoxy resin (containing C and O atoms), and an epoxy reactive diluent (containing C and O atoms). The conductive material is formed from a scale-like graphite (containing C atom) and graphite scrap (containing C atom) as the filler having a graphite-like structure, a PPS resin (containing C and S atoms) as the organic polymer particles, and nylon 6 (containing C, N, and O atoms) as the thermoplastic resin for the dispersing medium.

In the S atom mapping, a significant island part corresponding to the agglomeration B is observed and is considered to be derived from the PPS resin. In the C atom mapping, signals corresponding to the agglomerations A and C are observed and the agglomeration A of the insulating material is considered to be an island part derived from the nylon 6 resin. The agglomeration C of the conductive material shows a signal stronger than that of the agglomeration A, it seems that graphite is mixed with the nylon 6 resin, and the C atom mapping spreads throughout to form a continuous phase. In the N atom mapping, as for the insulating material, a signal derived from hexagonal boron nitride strongly appears, and it is considered that the hexagonal boron nitride and the reactive dispersing medium are entangled to form a continuous phase. As for the conductive material, in a part except the island part (the agglomeration B) of the PPS resin, the N atom mapping spreads as a weak signal, and it is considered that the nylon 6 resin and the graphite are entangled to form a continuous phase. In the O atom mapping, although a signal is weak, the signal appears at parts derived from the nylon 6 resin and the reactive dispersing medium.

As mentioned above, in the SEM/EDX analysis of the molded article produced in Example 26, it is considered that the nylon 6 resin part forms a filler-non-rich phase in the insulating material, the PPS resin part forms a filler-non-rich phase in the conductive material, in the former, the hexagonal boron nitride and the reactive dispersing medium are micro-dispersed, in the latter, the nylon 6 resin and the graphite are entangled and mixed to form a continuous phase as a filler-rich phase, and both are in contact with each other at the interface and exhibit a high thermal conductivity. The formation process of the filler-non-rich phase can be described by the difference in surface free energy between the filler and the resin as mentioned above.

Examples 27 and 28 and Comparative Example 11: Effect by Existence of Resin Molding of Stator Using an outer rotor type CQ brushless motor & inverter kit for an electric vehicle (original seller: CQ Publishing Co., Ltd.) a torque sensor and a powder brake were attached onto the rotation shaft of the motor, heat generation status in a stator coil portion and the motor performance at the time of operating the motor were investigated, and the effect by existence of resin molding to the stator was investigated.

Figure 4:
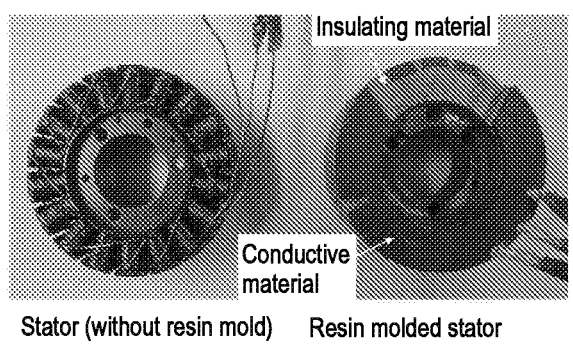
FIG. 4 illustrates photographs of stators without resin molding (left) and with resin molding (right) used in motor evaluation in Examples.

FIG. 4 illustrates photographs of stators without resin molding (left) and with resin molding (right) used in motor evaluation. A resin mold having a three-layer structure of an exterior conductive material (filler concentration 64 wt %) obtained from the dispersion liquid composition of Example 22 disposed at the outside of a resin molded stator, an interior conductive material (filler concentration 60 wt %) obtained from the dispersion liquid composition of Example 4 disposed at the inner interface thereof, and an interior conductive material (filler concentration 40 wt %) obtained from the dispersion liquid composition of Example 2 disposed inside a coil portion was disposed (Example 27). Further, an example in which a resin mold having a two-layer structure was disposed similarly except that the conductive material (filler concentration 40 wt %) of Example 17 was used as an interior conductive material was regarded as Example 28.

A temperature sensor was attached to the inner portion of the coil portion, the motor performance and the exothermic behavior were investigated, and then an increase in temperature in each number of revolutions at a certain torque (1.1 Nm) and an increase in temperature at each torque in a certain number of revolutions (100 rpm) are presented in the following Table 7. Incidentally, as presented in Table 7, the case of using a stator without resin molding was regarded as Comparative Example 11 and then the result of the Comparative Example 11 was compared with the results of Examples 27 and 28. As a result, it was found that by employing resin molding in Examples, an increase in temperature at 5 to 28° C. can be prevented.

TABLE 7

| | Example and Comparative Example | | |
|---|---|---|---|
| | Example 27 | Example 28 | Comparative Example 11 |
| Exterior material | Example 22 (conductive material) | Example 22 (conductive material) | None |
| Interior material | Examples 2 and 4 (insulating material) | Example 17 (conductive material) | None |
| Torque (Nm) | 1.1  1.1  0.9  1.5 | 1.1  1.1  0.9  1.5 | 1.1  1.1  0.9  1.5 |
| Number of revolutions (rpm) | 100  300  100  100 | 100  300  100  100 | 100  300  100  100 |
| Temperature increase (° C.) | 45  41  30  90 | 42  38  28  82 | 55  52  35  110 |

The present application is based on Japanese Patent Application No. 2017-219202 filed on Nov. 14, 2017, the entire disclosure of which is incorporated by reference.

The invention claimed is:

1. A method for producing a filler-loaded high thermal conductive material, the method comprising:
    a step (1) of obtaining a powder composition, which contains organic polymer particles containing thermoplastic polymer particles, and high thermal conductive filler particles which contain graphite-like filler particles selected from the group consisting of a graphite, hexagonal boron nitride, hexagonal silicon carbide, molybdenum disulfide, tungsten disulfide, and mixtures thereof, by pulverizing 5 to 70 parts by weight of the organic polymer particles and 30 to 95 parts by weight of the high thermal conductive filler particles with respect to 100 parts by weight of the total amount of these components by using a pulverizing machine, which performs grinding with frictional force or impact force, to cause delamination or cohesive failure while maintaining an average planar particle size of the graphite-like filler particles having a graphite-like structure, in the powder composition, the vicinity of the high thermal conductive filler particles being covered with the micronized organic polymer particles and the covered particles being uniformly dispersed;
    a step (2) of uniformly dispersing the powder composition using 25 to 250 parts by weight of a liquid reactive dispersing medium and/or a dispersing medium containing a thermoplastic polymer having a deflection temperature under load or a melting point lower than that of the thermoplastic polymer particles used in the powder composition by 5 to 150° C. with respect to 100 parts by weight of the powder composition to prepare a dispersion liquid composition having conditions that a thermal conductive infinite cluster exhibiting a thermal conductivity of 1 to 35 W/mK is formed and a concentration of the high thermal conductive filler particles is equal to or more than a percolation threshold;
    a crosslinking step (3) of allowing the dispersion liquid composition to react under a condition that the liquid reactive dispersing medium forms a crosslinked polymer when the dispersing medium comprises the liquid reactive dispersing medium;
    a fluidizing step (4) of fluidizing the thermoplastic polymer used in the dispersing medium at a temperature that is equal to or lower than a deflection temperature under load or a melting point of the thermoplastic polymer used in the powder composition and is equal to or higher than a deflection temperature under load or a melting point of the thermoplastic polymer used in the dispersing medium when the dispersing medium comprises the thermoplastic resin;
    a step (5) of molding by heating the material formed in the crosslinking step (3) and/or the fluidizing step (4) at a pressure of 0 to 1000 kgf/cm$^2$ and at a temperature equal to or higher than a deflection temperature under load or a melting point of the thermoplastic polymer particles used in the powder composition; and
    a step (6) of cooling and solidifying the material formed in the step (5).

2. The method according to claim 1, wherein the condition that the liquid reactive dispersing medium forms a crosslinked polymer is that the reactive dispersing medium has a degree of cure of 80% or more.

3. The method according to claim 1, wherein the dispersing medium comprises the liquid reactive dispersing medium.

4. The method according to claim 1, wherein the dispersing medium does not comprise the liquid reactive dispersing medium.

5. The method according to claim 1, wherein the dispersing medium does not comprise the thermoplastic polymer having a deflection temperature under load or a melting point lower than that of the thermoplastic polymer used in the powder composition by 5 to 150° C.

6. The method according to claim 1, wherein the thermoplastic polymer particles used in the powder composition contain at least one selected from the group consisting of a thermoplastic resin and a thermoplastic elastomer, all of which have crystallinity and/or aromaticity.

7. The method according to claim 1, wherein the thermoplastic polymer particles used in the powder composition contain at least one selected from the group consisting of polyphenylene sulfide, polyethylene terephthalate, polybutylene terephthalate, polycarbonate, polyamide, polyethylene, and polypropylene.

8. The method according to claim 1, wherein the graphite-like filler particles contain hexagonal boron nitride.

9. The method according to claim 8, wherein the graphite-like filler particles further contain magnesium oxide.

10. The method according to claim 1, wherein the graphite-like filler particles contain a graphite.

11. The method according to claim 10, wherein the graphite contains natural graphite and/or an artificial graphite.

12. The method according to claim 11, wherein the natural graphite contains scale-like graphite.

13. The method according to claim 1, wherein the liquid dispersing medium contains the reactive dispersing medium and the reactive dispersing medium contains an uncured thermosetting resin.

14. The method according to claim 13, wherein the uncured thermosetting resin contains a benzoxazine resin and/or a phenol-based epoxy resin.

15. The method according to claim 14, wherein the curing agent contains at least one selected from the group consisting of an amine-modified silicone resin, an alcohol-modified silicone resin, and a carboxylic acid-modified silicone resin.

16. The method according to claim 13, wherein the uncured thermosetting resin contains an epoxy reactive diluent and/or an epoxy-modified silicone resin.

17. The method according to claim 13, wherein the liquid reactive dispersing medium contains a curing agent.

18. The method according to claim 13, wherein the reactive dispersing medium contains a catalyst.

19. The method according to claim 18, wherein the catalyst contains an imidazole compound.

20. The method according to claim 1, wherein the dispersing medium contains the thermoplastic polymer and a deflection temperature under load or a melting point of the thermoplastic polymer is lower than that of the thermoplastic polymer particles used in the powder composition by 10 to 100° C.

* * * * *